US012812403B2

(12) United States Patent
Fan et al.

(10) Patent No.: US 12,812,403 B2
(45) Date of Patent: Nov. 24, 2026

(54) BEAM INDICATION METHOD AND APPARATUS

(71) Applicant: Huawei Technologies Co., Ltd., Shenzhen (CN)

(72) Inventors: Bo Fan, Chengdu (CN); Xi Zhang, Beijing (CN); Shitong Yuan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 18/647,181

(22) Filed: Apr. 26, 2024

(65) Prior Publication Data

US 2024/0298192 A1 Sep. 5, 2024

Related U.S. Application Data

(63) Continuation of application No. PCT/CN2022/127462, filed on Oct. 25, 2022.

(30) Foreign Application Priority Data

Oct. 29, 2021 (CN) ......................... 202111275910.7

(51) Int. Cl.
*H04W 16/28* (2009.01)
*H04W 72/231* (2023.01)
(Continued)

(52) U.S. Cl.
CPC ......... *H04W 16/28* (2013.01); *H04W 72/231* (2023.01); *H04W 76/20* (2018.02); *H04W 80/02* (2013.01)

(58) Field of Classification Search
CPC .............................. H04W 16/28; H04W 72/31
See application file for complete search history.

(56) References Cited

U.S. PATENT DOCUMENTS

2022/0150944 A1* 5/2022 Venugopal ........... H04B 7/0417
2022/0311577 A1* 9/2022 Matsumura ........... H04L 5/0053

FOREIGN PATENT DOCUMENTS

CN 111586846 A 8/2020

OTHER PUBLICATIONS

Enhancement on multi-beam operation, 3GPP Draft; R1-2109180, 3rd Generation Partnership Project (3GPP), Mobile Competence Centre; 650 Route Des Lucioles; F-06921 Sophia-Antipolis Cedex; France, vol. RAN WG1, No. E-Meeting; Oct. 11, 2021-Oct. 19, 2021 Sep. 30, 2020 XP052058137 (TCL Communication) (Year: 2020).*

(Continued)

*Primary Examiner* — Myron Wyche
(74) *Attorney, Agent, or Firm* — Slater Matsil, LLP

(57) ABSTRACT

A beam indication method and an apparatus are provided. The method includes: A terminal device receives first configuration information from a network device, to configure M common beams of a same type, where M is an integer greater than 1. The terminal device receives first indication information from the network device, to activate N common beams, and group the N common beams into a first common beam group and a second common beam group, where N is an integer greater than 1 and less than or equal to M. Further, the terminal device receives one or more pieces of first downlink control information from the network device, to indicate two common beams of a same type.

16 Claims, 5 Drawing Sheets

(51) Int. Cl.
*H04W 76/20* (2018.01)
*H04W 80/02* (2009.01)

(56) References Cited

OTHER PUBLICATIONS

"Enhancement on multi-beam operation", 3GPP Draft; R1-2008956, 3rd Generation Partnership Project (3GPP), Mobile Competence Centre; 650 Route Des Lucioles; F-06921 Sophia-Antipolis Cedex; France, vol. RAN WG1, No. e-Meeting; Oct. 26, 2020-202011131 Nov. 2020 (Nov.1, 2020) XP052350888 (Mediatek). (Year: 2020).*
3GPP TS 38.331 V15.3.0 (Sep. 2018):"3rd Generation Partnership Project; Technical Specification Group Radio Access Network;NR;Radio Resource Control (RRC) protocol specification(Release 15)", total 445 pages.
3GPP TS 38.211 V15.0.0 (Dec. 2017):3rd Generation Partnership Project; Technical Specification Group Radio Access Network;NR;Physical channels and modulation(Release 15, total 73 pages.
3GPP TS 38.212 V15.0.0 (Dec. 2017):"3rd Generation Partnership Project; Technical Specification Group Radio Access Network;NR;Multiplexing and channel coding(Release 15)", total 82 pages.
3GPP TS 38.213 V15.0.0 (Dec. 2017):"3rd Generation Partnership Project; Technical Specification Group Radio Access Network;NR;Physical layer procedures for control(Release 15)", total 56 pages.
3GPP TS 38.214 V15.0.0 (Dec. 2017):"3rd Generation Partnership Project; Technical Specification Group Radio Access Network;NR;Physical layer procedures for data (Release 15)", total 71 pages.
3GPP TSG RAN WG1 #103-e e-Meeting, R1-2008956, Enhancement on multi-beam operation, MediaTek Inc., Oct. 26-Nov. 13, 2020,XP052350888, total 16 pages.
3GPP TSG RAN WG1 #106bis-e E-Meeting, R1-2109180, Enhancements on multi-beam operation, TCL Communication Ltd.,Oct. 11-19, 2021,XP052058137, total 10 pages.
3GPP TSG RAN WG1 Meeting #103-e e-Meeting, R1-2007763, Enhancements on Multi-beam Operation,ZTE, Oct. 26-Nov. 13, 2020,XP051946497, total 19 pages.

* cited by examiner

BEAM INDICATION METHOD AND APPARATUS

CROSS-REFERENCE TO RELATED APPLICATIONS

This application is a continuation of International Application No. PCT/CN2022/127462, filed on Oct. 25, 2022, which claims priority to Chinese Patent Application No. 202111275910.7, filed on Oct. 29, 2021. The disclosures of the aforementioned applications are hereby incorporated by reference in their entireties.

TECHNICAL FIELD

This application relates to the field of communication technologies, and in particular, to a beam indication method and an apparatus.

BACKGROUND

In a 5th generation (5G) mobile communication system, uplink and downlink data transmission may be performed between a network device and a terminal device by using a specific beam. For transmission of a plurality of channels or reference signals, the network device may indicate one common beam to the terminal device for transmission, or may indicate a plurality of common beams to the terminal device for transmission. When the terminal device moves, the network device indicates a new common beam to the terminal device, to replace a previous common beam for transmission. For example, the network device may indicate a common beam 1 to the terminal device by using downlink control information (DCI). In this case, the terminal device always uses the common beam 1 in subsequent transmission. After the network device indicates another beam 2 of a same type to the terminal device again, the terminal device replaces the previously used common beam 1 with the common beam 2, and uses the common beam 2 in subsequent transmission.

In a multi-base station transmission scenario, each base station needs to perform transmission with the terminal device by using one common beam. However, when the network device indicates a plurality of common beams of a same type to the terminal device, the terminal device cannot determine whether the indicated plurality of common beams of the same type correspond to a same base station. In this case, the terminal device usually can perform transmission by selecting only one of the common beams. Consequently, the terminal device cannot simultaneously communicate with a plurality of base stations.

Therefore, a beam indication method needs to be urgently provided, so that a common beam indicated by the network device can be accurately distinguished. This can ensure communication between the network device and the terminal device.

SUMMARY

A beam indication method and an apparatus are provided, so that a common beam indicated by a network device can be accurately distinguished. This can ensure transmission between the network device and a terminal device.

According to a first aspect, an embodiment of this application provides a beam indication method. The method may be performed by a processor of a terminal device, or may be performed by a chip corresponding to a processor. This is not limited herein. Specifically, the method includes the following steps: The terminal device receives first configuration information from a network device, where the first configuration information is used to configure M common beams of a same type, and M is an integer greater than 1; the terminal device receives first indication information from the network device, where the first indication information is used to activate N common beams in the M common beams of the same type, and indicates that the N common beams are grouped into a first common beam group and a second common beam group, and N is an integer greater than 1 and less than or equal to M; the terminal device receives second indication information from the network device, where the second indication information indicates two common beams, and the two common beams respectively belong to the first common beam group and the second common beam group, or the two common beams both belong to the first common beam group, or the two common beams both belong to the second common beam group; and the terminal device communicates with the network device by using at least one of the two common beams based on a common beam group to which the two common beams belong.

In this implementation, after receiving the second indication information from the network device, the terminal device determines that the two common beams of a same type in the second indication information belong to a same common beam group, or that the two common beams of a same type belong to different common beam groups, to determine to use one or two common beams communicate with the network device. It is clearly that, in the method, the terminal device can accurately determining whether the two common beams of the same type belong to a same common beam group, in other words, whether the two common beams of the same type correspond to a same network device. According to the method, it can be ensured that the terminal device communicates with the network device by using one common beam, and it can also be ensured that the terminal device communicates with corresponding network devices by using the two common beams of the same type.

In a possible implementation, that the terminal device communicates with the network device by using at least one of the two common beams based on a common beam group to which the two common beams belong includes: If the two common beams respectively belong to the first common beam group and the second common beam group, the terminal device communicates with network devices by using the two common beams; or if the two common beams both belong to the first common beam group or both belong to the second common beam group, the terminal device communicates with the network device by using a common beam that is indicated later or that takes effect later in the two common beams.

In this implementation, the terminal device may determine, based on the common beam group to which the two common beams belong, to communicate with the network device by using one common beam or two common beams. If the two common beams do not belong to a same common beam group, the terminal device separately communicates with corresponding network devices by using the two common beams, to implement a communication requirement on the network device side. If the two common beams belong to a same common beam group, the terminal device determines a specific common beam that is indicated by the network device and whose indication time or effective time is later, and then the terminal device selects the common beam that is indicated later or that takes effect later to communicate with the network device. This can ensure real-time performance and accuracy of communication.

In a possible implementation, the first common beam group includes a first half of the N common beams, and the second common beam group includes a second half of the N common beams; or the first common beam group includes a common beam whose sequence number is an odd number in the N common beams, and the second common beam group includes a common beam whose sequence number is an even number in the N common beams.

In this implementation, the N activated common beams may be effectively grouped into two groups in the foregoing two grouping manners, and each group corresponds to one network device for use. In this way, the terminal device may accurately determine, based on a case in which the two common beams of the same type that are indicated by the network device belong to the two common beam groups, whether network devices corresponding to the two common beams of the same type are the same, to determine to use one common beam or two common beams to ensure communication with the network device.

In a possible implementation, the second indication information includes two pieces of first downlink control information, and each piece of first downlink control information indicates one of the two common beams.

In this implementation, there may be two cases in which the second indication information received by the terminal device from the network device includes the downlink control information. This implementation is a first case. In this case, the network device can indicate the two common beams by using the two pieces of downlink control information.

When the second indication information received by the terminal device includes the two pieces of first downlink control information, each piece of first downlink control information may be defined according to a rule in the following implementations.

In a first implementation, each piece of first downlink control information includes a single transmission configuration indicator (TCI) field, and the TCI field corresponds to one of the first common beam group and the second common beam group. A first field in the first downlink control information indicates that common beams corresponding to all field values of the TCI field all belong to the first common beam group or the second common beam group; or some bits of the TCI field in the first downlink control information indicate that common beams corresponding to all field values of the TCI field all belong to the first common beam group or the second common beam group; or a control resource set group identifier corresponding to the first downlink control information indicates that common beams corresponding to all field values of the TCI field all belong to the first common beam group or the second common beam group.

In this implementation, each piece of first downlink control information may be defined according to the rule in this implementation. In this way, after receiving the second indication information, the terminal device may determine, according to the rule defined in this implementation, whether the two common beam groups of the same type that are indicated by the second indication information belong to the first common beam group or the second common beam group, and then the terminal device can accurately determine to use one or two common beams to communicate with the network device.

In a second implementation, each piece of first downlink control information includes a single TCI field, all field values of the TCI field are divided into two parts, a common beam corresponding to field values in a first part of the two parts belongs to the first common beam group, and a common beam corresponding to field values in a second part of the two parts belongs to the second common beam group.

In this implementation, each piece of first downlink control information may be defined according to the rule in this implementation. In this way, after receiving the second indication information, the terminal device may determine, according to the rule defined in this implementation, whether the two common beams of the same type that are indicated by the second indication information belong to the first common beam group or the second common beam group, and then the terminal device can accurately determine to use one or two common beams to communicate with the network device.

In a possible implementation, the field values in the first part are a first half of all the field values, and the field values in the second part are a second half of all the field values; or the field values in the first part are even field values in all the field values, and the field values in the second part are odd field values in all the field values; or the field values in the first part are the first S field values in all the field values, and the field values in the second part are remaining field values other than the first S field values in all the field values, where S is an integer value greater than 0.

It should be noted that, in this embodiment of this application, a value of S is equal to a quantity of beams in the first common beam group or a quantity of beams in the second common beam group; or a value of S is indicated by fourth indication information, where the fourth indication information may be second configuration information, second MAC-CE information, or second downlink control information; or a value of S may be a value agreed upon between the terminal device and the network device. This is not specifically limited in this application.

In this implementation, the field values of the TCI field in each piece of first downlink control information may be effectively divided into two parts, and it is specified that all common beams corresponding to field values in each part correspond to one common beam group. In this way, after receiving the second indication information, the terminal device may determine a specific part corresponding to the two common beams indicated by the second indication information, to accurately determine the common beam group to which the two common beams belong. Finally, the terminal device may determine to use one or two common beams to communicate with the network device.

In a possible implementation, the second indication information includes one piece of first downlink control information, and the first downlink control information indicates the two common beams.

In this implementation, there may be two cases in which the second indication information received by the terminal device from the network device includes the downlink control information. This implementation is a second case. In this case, the network device can indicate the two common beams by using one piece of downlink control information.

When the second indication information received by the terminal device includes one piece of downlink control information, the downlink control information may be defined according to a rule in the following implementations.

In a possible implementation, the first downlink control information includes two TCI fields, a common beam corresponding to one of the two TCI fields belongs to the first common beam group, and a common beam corresponding to the other of the two TCI fields belongs to the second common beam group.

When a first condition is met, the first downlink control information includes the two TCI fields.

The first condition may include any one or more of the following:

(1) Two common beam sets of a same type are configured in the first configuration information.

(2) In configuration of the first configuration information, common beams of a same type are divided into two parts that are respectively configured in the two sets.

(3) The first configuration information includes third indication information, where the third indication information indicates that a quantity of field values included in the first downlink control information is 2, or the third indication information indicates that there are the two TCI fields in the first downlink control information, or the third indication information indicates that the terminal device needs to use or maintain two common beams of a same type.

In another possible implementation, if the first condition is met, the first downlink control information includes only one TCI field.

In this implementation, when the first condition is met, the network device indicates the two common beams of the same type by using the two fields in the first downlink control information. After receiving the first downlink control information sent by the network device, the terminal device side learns of specific fields respectively indicating the two common beams of the same type. If the two common beams of the same type are respectively indicated by a same field, the terminal device may determine that the two common beams belong to different common beam groups. If the two common beams of the same type both are indicated by one of the two fields, the terminal device may determine that the two common beams belong to a same common beam group. If the first condition is not met, the network device indicates the two common beams of the same type by using a field in the first downlink control information to, so that the terminal device can learn that the two common beams of the same type belong to a same common beam group. In this way, if the two common beams indicated by the network device to the terminal device belong to a same common beam group, the terminal device performs communication by using one of the two common beams; or if the two common beams indicated by the network device to the terminal device do not belong to a same common beam group, the terminal device separately performs communication by using the two common beams.

In a second implementation, the first downlink control information includes a single TCI field, a field value of the TCI field indicates the two common beams, and the two common beams respectively belong to the first common beam group and the second common beam group.

In this implementation, the first downlink control information includes a single TCI field, a specified field value of the TCI field simultaneously indicates the two common beams, and the two common beams belong to different common beam groups. In this way, after receiving one piece of first downlink control information from the network device based on this definition, the terminal device may directly determine, based on the first downlink control information, that the indicated two common beams belong to the different common beam groups, and then the terminal device effectively communicates with corresponding network devices respectively by using the two common beams.

According to a second aspect, an embodiment of this application provides a beam indication method. The method may be performed by a processor of a network device, or may be performed by a chip corresponding to a processor. This is not limited herein. Specifically, the method includes the following steps: The network device sends first configuration information to a terminal device, where the first configuration information is used to configure M common beams of a same type, and M is an integer greater than 1; the network device sends first indication information to the terminal device, where the first indication information is used to activate N common beams in the M common beams of the same type, and group the N common beams into a first common beam group and a second common beam group, and N is an integer greater than 1 and less than or equal to M; the network device sends second indication information to the terminal device, where the second indication information indicates two common beams, and the two common beams respectively belong to the first common beam group and the second common beam group, or the two common beams both belong to the first common beam group, or the two common beams both belong to the second common beam group.

In this implementation, the network device sends the first configuration information to the terminal device, to configure the M common beams of the same type for the terminal device, and activates the N common beams from the M common beams of the same type by using the first indication information. In this way, when the network device sends the second indication information to the terminal device, to indicate two common beams of a same type, the terminal device determines whether the two common beams belong to a same common beam group or different common beam groups. Finally, this can ensure effective communication between the terminal device and the network device.

In a possible implementation, the first common beam group includes a first half of the N common beams, and the second common beam group includes a second half of the N common beams; or the first common beam group includes a common beam whose sequence number is an odd number in the N common beams, and the second common beam group includes a common beam whose sequence number is an even number in the N common beams. For effects achieved in this implementation, refer to the effects achieved in the corresponding implementation of the first aspect. Details are not described herein again.

In a possible implementation, the second indication information includes two pieces of first downlink control information, and each piece of first downlink control information indicates one of the two common beams. For effects achieved in this implementation, refer to the effects achieved in the corresponding implementation of the first aspect. Details are not described herein again.

When the second indication information sent by the network device to the terminal device includes the two pieces of first downlink control information, each piece of first downlink control information may be defined according to a rule in the following implementations.

In a possible implementation, each piece of first downlink control information includes a single TCI field, and the TCI field corresponds to one of the first common beam group and the second common beam group. A first field in the first downlink control information indicates that common beams corresponding to all field values of the TCI field all belong to the first common beam group or the second common beam group; or some bits of the TCI field in the first downlink control information indicate that common beams corresponding to all field values of the TCI field all belong to the first common beam group or the second common beam group; or a control resource set group identifier corresponding to the first downlink control information indicates that common beams corresponding to all field values of the TCI field all belong to the first common beam group or the second common beam group. For effects achieved in this implementation, refer to the effects achieved in the corresponding implementation of the first aspect. Details are not described herein again.

In another possible implementation, each piece of first downlink control information includes a single TCI field, all field values of the TCI field are divided into two parts, a common beam corresponding to field values in a first part of the two parts belongs to the first common beam group, and a common beam corresponding to field values in a second part of the two parts belongs to the second common beam group. For effects achieved in this implementation, refer to the effects achieved in the corresponding implementation of the first aspect. Details are not described herein again.

In a possible implementation, the field values in the first part are a first half of all the field values, and the field values in the second part are a second half of all the field values; or the field values in the first part are even field values in all the field values, and the field values in the second part are odd field values in all the field values; or the field values in the first part are the first S field values in all the field values, and the field values in the second part are remaining field values other than the first S field values in all the field values, where S is an integer greater than 0. For effects achieved in this implementation, refer to the effects achieved in the corresponding implementation of the first aspect. Details are not described herein again.

It should be noted that, in this embodiment of this application, a value of S is equal to a quantity of beams in the first common beam group or a quantity of beams in the second common beam group; or a value of S is indicated by fourth indication information, where the fourth indication information may be second configuration information, second MAC-CE information, or second downlink control information; or a value of S may be a value agreed upon between the terminal device and the network device. This is not specifically limited in this application.

In a possible implementation, the second indication information includes a single piece of first downlink control information, and the first downlink control information indicates the two common beams. For effects achieved in this implementation, refer to the effects achieved in the corresponding implementation of the first aspect. Details are not described herein again.

When the second indication information sent by the network device to the terminal device includes the single piece of first downlink control information, the first downlink control information may be defined according to a rule in the following implementations.

In an implementation, the first downlink control information includes two TCI fields, a common beam corresponding to one of the two TCI fields belongs to the first common beam group, and a common beam corresponding to the other of the two TCI fields belongs to the second common beam group.

When a first condition is met, the first downlink control information includes the two TCI fields, where the first condition may include any one or more of the following:

(1) Two common beam sets of a same type are configured in the first configuration information.

(2) In configuration of the first configuration information, common beams of a same type are divided into two parts that are respectively configured in the two sets.

(3) The first configuration information includes third indication information, where the third indication information indicates that a quantity of field values included in the first downlink control information is 2, or the third indication information indicates that there are the two TCI fields in the first downlink control information, or the third indication information indicates that the terminal device needs to use or maintain two common beams of a same type.

In another implementation, if the first condition is met, the first downlink control information includes only one TCI field.

For effects achieved in this implementation, refer to the effects achieved in the corresponding implementation of the first aspect. Details are not described herein again.

In a possible implementation, the first downlink control information includes a single TCI field, a field value of the TCI field indicates the two common beams, and the two common beams respectively belong to the first common beam group and the second common beam group. For effects achieved in this implementation, refer to the effects achieved in the corresponding implementation of the first aspect. Details are not described herein again.

According to a third aspect, an embodiment of this application provides a communication apparatus. The apparatus may be used in a terminal device, and has a function of implementing the method in any one of the first aspect or the possible implementations of the first aspect. The function may be implemented by hardware, or may be implemented by hardware executing corresponding software. The hardware or the software includes one or more units corresponding to the function. For example, the hardware or the software includes a transceiver unit and a processing unit. The transceiver unit may also be referred to as a communication unit or a transceiver module. The transceiver unit may specifically include a receive unit and a transmit unit. The processing unit may also be referred to as a processing module.

According to a fourth aspect, an embodiment of this application provides a communication apparatus. The apparatus may be used in a network device, and has a function of implementing the method in any one of the second aspect or the possible implementations of the second aspect. The function may be implemented by hardware, or may be implemented by hardware executing corresponding software. The hardware or the software includes one or more units corresponding to the function. For example, the hardware or the software includes a transceiver unit and a processing unit. The transceiver unit may also be referred to as a communication unit or a transceiver module. The transceiver unit may specifically include a receive unit and a transmit unit. The processing unit may also be referred to as a processing module.

According to a fifth aspect, an embodiment of this application provides a communication apparatus. The communication apparatus includes a processor and a memory. The memory stores a computer program or computer instructions. The processor is configured to invoke and run the computer program or the computer instructions stored in the memory, so that the processor implements any one of the first aspect or the possible implementations of the first aspect, or the processor implements any one of the second aspect or the possible implementations of the second aspect.

Optionally, the communication apparatus further includes a transceiver. The processor is configured to control the transceiver to receive and send a signal and/or information and/or data, and the like.

According to a sixth aspect, an embodiment of this application provides a communication apparatus. The communication apparatus includes a processor. The processor is configured to invoke a computer program or computer instructions in a memory, so that the processor implements any one of the first aspect or the possible implementations of the first aspect, or the processor is configured to perform any one of the second aspect or the possible implementations of the second aspect.

Optionally, the communication apparatus further includes a transceiver. The processor is configured to control the transceiver to receive and send a signal and/or information and/or data, and the like.

According to a seventh aspect, an embodiment of this application provides a communication apparatus. The communication apparatus includes a processor. The processor is configured to perform any one of the first aspect or the possible implementations of the first aspect, or the processor is configured to perform any one of the second aspect or the possible implementations of the second aspect.

According to an eighth aspect, an embodiment of this application further provides a computer program product including instructions. When the computer program product runs on a computer, the computer is enabled to perform any one of the first aspect or the possible implementations of the first aspect, or the computer is enabled to perform any one of the second aspect or the possible implementations of the second aspect.

According to a ninth aspect, an embodiment of this application further provides a computer-readable storage medium, including computer instructions. When the instructions are run on a computer, the computer is enabled to perform any one of the first aspect or the possible implementations of the first aspect, or the computer is enabled to perform any one of the second aspect or the possible implementations of the second aspect.

According to a tenth aspect, an embodiment of this application further provides a chip apparatus. The chip apparatus includes a processor, configured to invoke a computer program or computer instructions in a memory, so that the processor performs any one of the first aspect or the possible implementations of the first aspect, or the processor performs any one of the second aspect or the possible implementations of the second aspect.

Optionally, the processor is coupled to the memory through an interface.

For technical effects that can be achieved in any one of the third aspect or the possible implementations of the third aspect, refer to description of technical effects that can be achieved in any one of the first aspect or the possible implementations of the first aspect. For technical effects that can be achieved in any one of the fourth aspect or the possible implementations of the fourth aspect, refer to description of technical effects that can be achieved in any one of the second aspect or the possible implementations of the second aspect. Details are not described herein again.

DETAILED DESCRIPTION OF ILLUSTRATIVE EMBODIMENTS

Figure 1A:
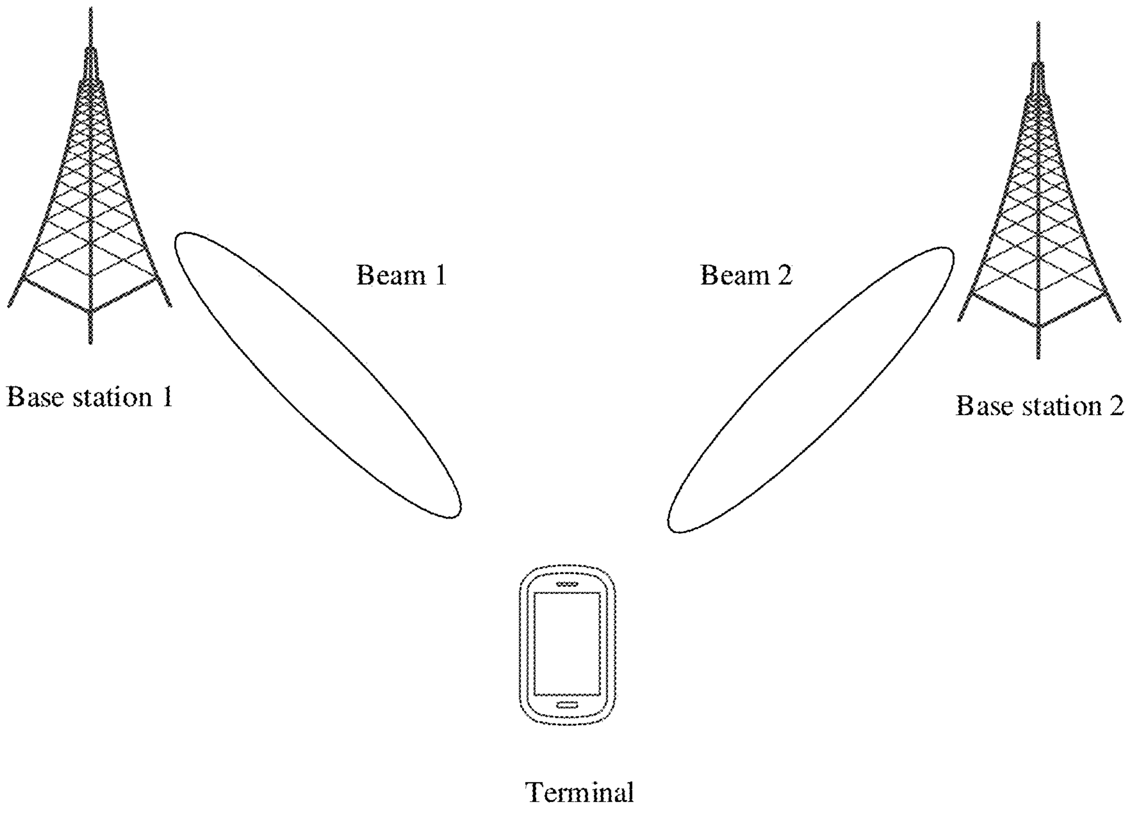
FIG. 1A is a schematic diagram depicting that a terminal device communicates with a network device by using a beam.

Embodiments of this application provide a beam indication method and an apparatus. The method and the apparatus are based on a same technical concept. Because problem-resolving principles of the method and the apparatus are similar, mutual reference may be made to implementations of the apparatus and the method, and no repeated description is provided.

The following describes some terms in embodiments of this application, to facilitate understanding of a person skilled in the art.

(1) A beam in embodiments of this application is a communication resource. The beam may be a wide beam, a narrow beam, or a beam of another type. A technology for forming a beam may be a beamforming technology or another technical means. The beamforming technology may be specifically a digital beamforming technology, an analog beamforming technology, or a hybrid digital/analog beamforming technology. Different beams may be considered as different resources.

In an NR protocol, the beam may be referred to as a spatial domain filter, a spatial filter, a spatial domain parameter, a spatial parameter, a spatial domain setting, a spatial setting, quasi-colocation (QCL) information, a QCL assumption, a QCL indication, or the like. The beam may be indicated by a TCI-state parameter, or may be indicated by a spatial relation parameter. Therefore, in this application, a beam may be replaced with a spatial domain filter, a spatial filter, a spatial domain parameter, a spatial parameter, a spatial domain setting, a spatial setting, QCL information, a QCL assumption, a QCL indication, a TCI-state (including an uplink TCI-state or a downlink TCI-state), a spatial relation, or the like. The foregoing terms are also equivalent to each other. Alternatively, the beam may be replaced with another term indicating a beam. This is not limited in this application.

A beam used to send a signal may be referred to as a transmission (Tx) beam, a spatial domain transmission filter, a spatial transmission filter, a spatial domain transmission parameter, a spatial transmission parameter, a spatial domain transmission setting, or a spatial transmission setting. A downlink transmission beam may be indicated by a TCI-state.

A beam used to receive a signal may be referred to as a reception (Rx) beam, a spatial domain reception filter, a spatial reception filter, a spatial domain reception parameter, a spatial reception parameter, a spatial domain reception setting, or a spatial reception setting. An uplink transmission beam may be indicated by any one of a spatial relation, an uplink TCI-state, and an SRS resource (indicating a transmission beam using an SRS). Therefore, the uplink beam may alternatively be replaced with the SRS resource.

The transmission beam may refer to distribution of signal strength formed in different directions in space after a signal is transmitted via an antenna. The reception beam may refer to distribution of signal strength, in different directions in space, of a radio signal received via an antenna.

In addition, the beam may be a wide beam, a narrow beam, or a beam of another type. A technology for forming a beam may be a beamforming technology or another technology. The beamforming technology may be specifically a digital beamforming technology, an analog beamforming technology, a hybrid digital beamforming technology, a hybrid analog beamforming technology, or the like.

The beam usually corresponds to a resource. For example, during beam measurement, a network device measures different beams by using different resources, a terminal device feeds back measured resource quality, and the network device knows quality of a corresponding beam. During data transmission, beam information is also indicated by a resource corresponding to the beam information. For example, the network device indicates information about a PDSCH beam of the terminal device by using a TCI field in DCI.

Optionally, a plurality of beams having a same or similar communication feature may be considered as one beam. One beam may include one or more antenna ports, configured to transmit a data channel, a control channel, a sounding signal, and the like. The one or more antenna ports forming the beam may also be considered as one antenna port set.

In embodiments of this application, unless otherwise specified, the beam is a transmission beam of the network device. During beam measurement, each beam of the network device corresponds to one resource. Therefore, an index of the resource may be used to uniquely identify a beam corresponding to the resource.

(2) For an uplink beam in embodiments of this application, in a current protocol, a transmission beam for uplink transmission may be indicated by a spatial relation. The spatial relation has a function similar to that of a TCI-state, and is used to notify the terminal device of a specific transmission beam used for uplink transmission.

Figure 1B:
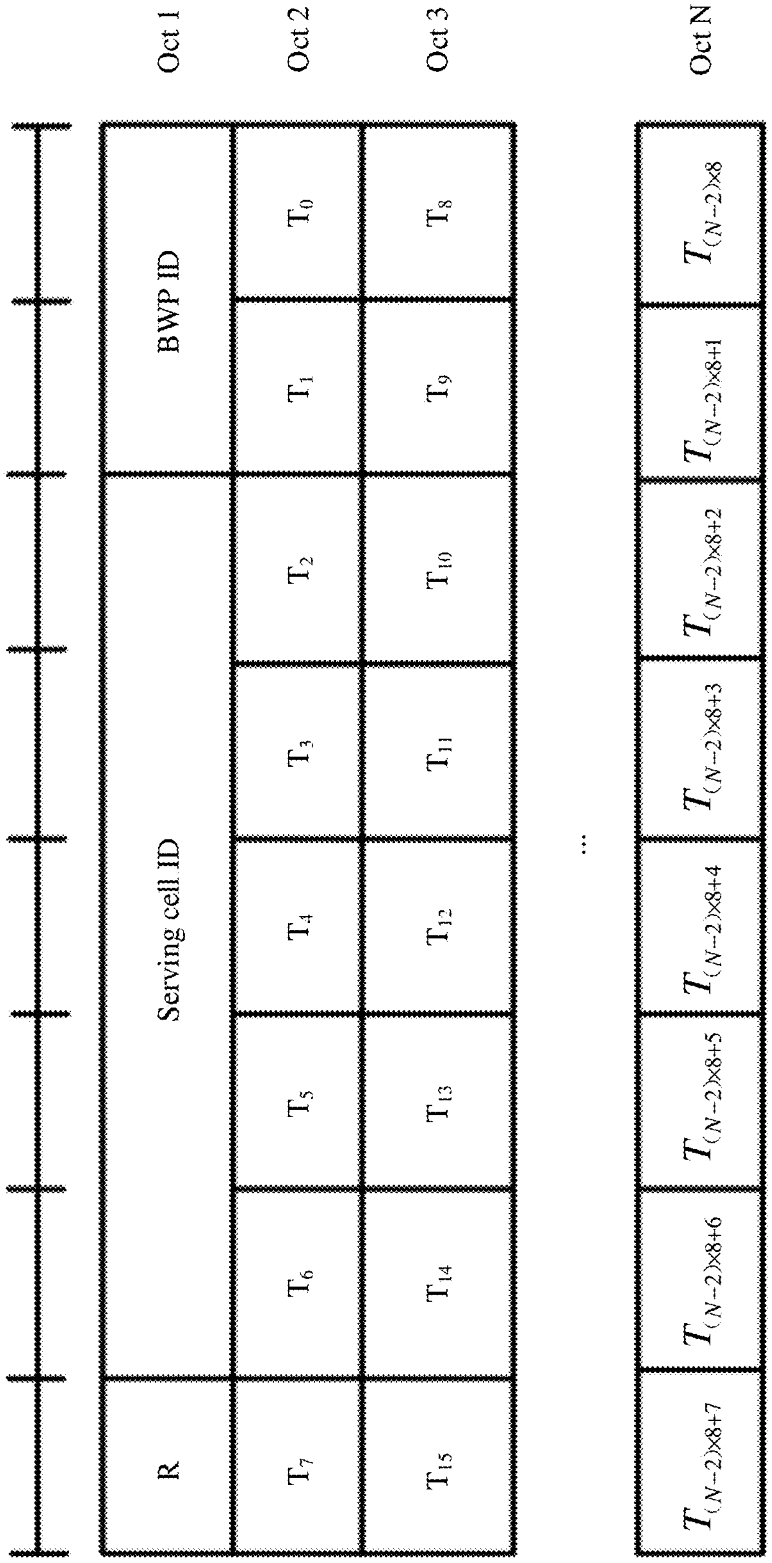
FIG. 1B is a schematic flowchart of indicating reception beam information to a terminal device by using a TCI-state.

The spatial relation needs to be first configured by using radio resource control (RRC) signaling. A configuration structure of the spatial relation is shown in FIG. 1B, and includes an ID of the spatial relation, a cell ID, a target reference signal resource, a path loss measurement reference signal, a power control parameter, and the like. The target reference signal resource indicates a corresponding uplink beam. If a spatial relation #1 is used for uplink transmission, and the spatial relation #1 includes a target reference signal resource #2, it indicates that a transmission beam used for the uplink transmission is a transmission/reception beam of a target reference signal. For example, when the target reference signal resource is an uplink resource SRS, it indicates that the transmission beam used for the uplink transmission is a transmission beam of the SRS (where the transmission beam of the SRS is known). For another example, when the target reference signal resource is a downlink resource like a synchronization signal block (SSB)/channel state information-reference signal (CSI-RS), it indicates that the transmission beam used for the uplink transmission is a reception beam of the SSB/CSI-RS (where the reception beam of the SSB/CSI-RS is known).

The network device may configure a plurality of spatial relations for the terminal device. Then, one of the spatial relations is activated, by using a MAC-CE, for corresponding data transmission. Uplink transmission includes a physical uplink control channel (PUCCH), a channel sounding reference signal (SRS), a physical uplink shared channel (PUSCH), and the like, which all require corresponding spatial relations. A spatial relation of the PUCCH is indicated by medium access control-control element (MAC-CE) signaling. A spatial relation of the SRS is also indicated by MAC-CE signaling. During PUSCH transmission, a specific SRS is associated, and a spatial relation of the SRS is used for transmission.

(3) A downlink beam in embodiments of this application may be indicated by a TCI-state.

The network device may generate different beams that point to different transmission directions. In downlink data transmission, when sending data to the terminal device by using a specified beam, the network device needs to notify the terminal device of information about the transmission beam used by the network device. In this way, the terminal device can receive, by using a reception beam corresponding to the transmission beam, the data sent by the network device. In the 3GPP R15/R16 protocol, the network device indicates, to the terminal device by using a transmission configuration indicator (TCI) field in downlink control information DCI, related information of the transmission beam used by the network device. Specifically, a size of the TCI field is 3 bits, and may specifically indicate eight different field values (codepoint). Each value of the TCI field corresponds to a TCI-state index, and the TCI-state index may uniquely identify a TCI-state. The TCI-state includes several parameters, and the related information of the transmission beam may be determined by using these parameters. The TCI-state is configured by the network device for each terminal device, and each TCI-state includes a TCI-state index, namely, tci-StateId, and two pieces of QCL-Info. Each piece of QCL-Info includes a cell field and a BWP-ID that respectively indicate a specific cell and a bandwidth part (BWP) in which the TCI-state is used. That is, different QCL-Info may be configured for different cells or different BMPs of a same cell. The QCL-Info further includes a reference signal (RS) indicating a specific reference signal resource with which a QCL relationship is formed. In the R15/R16 protocol, the term "beam" is usually not directly used, and the beam is usually replaced with another term. For example, in both data transmission and channel measurement, the beam corresponds to a reference signal resource, and one beam corresponds to one reference signal resource. Therefore, "a specific reference signal resource with which a QCL relationship is formed" herein essentially means "a specific beam with which a QCL relationship is formed." The QCL relationship means that two reference signal resources (or two antenna ports, where the antenna ports are in a one-to-one correspondence with the reference signal resources) have some same spatial parameters. Specifically, which spatial parameters are the same depends on a type of the QCL-Info, namely, another field qcl-Type of the QCL-Info. The field qcl-Type may have four values: {typeA, typeB, typeC, typeD}. Herein, typeD is used as an example, and typeD indicates that the two reference signal resources have information about a same spatial reception parameter. That is, two beams have a same reception beam. There is at most one typeD in the two pieces of QCL-Info included in the TCI-state.

(4) A common beam in embodiments of this application is a beam indicated by the network device to the terminal device, and the beam may be used for a plurality of channels and/or reference signals. In embodiments of this application, the beam is referred to as a common beam, or may have another name. This is not specifically limited in this application. In addition, the common beam may include an uplink common beam, a downlink common beam, and an uplink and downlink common beam. The uplink common beam may be used for transmission of a plurality of uplink channels and/or uplink reference signals, and the downlink common beam may be used for transmission of a plurality of downlink channels and/or downlink reference signals. The uplink and downlink common beam may be used for transmission of a plurality of uplink channels and/or uplink reference signals, and transmission of a plurality of downlink channels and/or downlink reference signals. In other words, the uplink and downlink common beam may be used for uplink transmission or downlink transmission.

It should be noted that the common beam may be specifically a TCI-state or other description. This is not specifically limited in this application. In addition, unless otherwise specified, the common beam in embodiments of this application may be any one of the uplink common beam, the downlink common beam, and the uplink and downlink common beam.

(5) An antenna panel in embodiments of this application may be an antenna panel of the network device, or may be an antenna panel of the terminal device. There are usually one or more antennas on one antenna panel. These antennas are arranged into an antenna array for beamforming, to constitute an analog beam. The antenna array may generate analog beams pointing to different directions. That is, a plurality of analog beams may be formed on each antenna panel, and an optimal analog beam used by the antenna panel may be determined through beam measurement. The terminal device may be equipped with a plurality of antenna panels. The antenna panels may be distributed at different locations, and face different directions. This can ensure that at least one antenna panel faces the network device regardless of a direction that the terminal device faces, and the terminal device can perform data transmission with the network device. The terminal device may simultaneously enable all antenna panels for transmission. Alternatively, to reduce power consumption of the terminal device, the terminal device may perform transmission by using only one antenna panel once, and another unused antenna panel may be disabled. Usually, the network device needs to be notified of whether the antenna panel of the terminal device is in an enabled state or a disabled state. In other words, the terminal device and the network device usually need to exchange status information of the antenna panels.

In embodiments of this application, unless otherwise specified, an antenna panel is the antenna panel of the terminal device. The antenna panel may alternatively be indicated by an antenna panel index or the like. In addition, the antenna panel may alternatively be implicitly indicated in another manner. For example, the antenna panel may alternatively be indicated by an antenna port (for example, a CSI-RS port, an SRS port, a demodulation reference signal (DMRS) port, a phase tracking reference signal (PTRS) port, a CRS port, a time-frequency tracking reference signal (TRS) port, or an SSB port) or an antenna port group; or may be indicated by a resource (for example, a CSI-RS resource, an SRS resource, a DMRS resource, a PTRS resource, a cell reference signal (CRS) resource, a TRS resource, or an SSB resource) or a resource group; or may be indicated by a channel (for example, a PUCCH, a PUSCH, a physical random access channel (PRACH), a PDSCH, a PDCCH, or a physical broadcast channel (PBCH)); or may be indicated by a beam, a QCL, a TCI-state, a spatial relation, or an index configured in a QCL, a TCI-state, or a spatial relation. Alternatively, the antenna panel may be indicated by a beam group, a QCL group, a TCI-state group, a spatial relation group, or the like. In other words, an identifier of the antenna panel/panel in this application may be replaced with an identifier of the foregoing content.

(6) "A plurality of" in embodiments of this application means two or more. The term "and/or" describes an association relationship for describing associated objects and indicates that three relationships may exist. For example, A and/or B may indicate the following three cases: Only A exists, both A and B exist, and only B exists. The character "/" usually indicates an "or" relationship between the associated objects. In addition, it should be understood that in description of this application, terms such as "first" and "second" are merely used for distinguishing and description, but should not be understood as indicating or implying relative importance, or should not be understood as indicating or implying a sequence.

(7) The terms "including", "having", and any other variant thereof mentioned in descriptions of embodiments of this application are intended to cover non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of this application, the word "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the term "example", "for example", or the like is intended to present a related concept in a specific manner.

The following briefly describes a conventional technology in which communication is performed by using a beam.

In 5G communication, data transmission between a base station and a terminal device may be performed by using a beam. A network device may determine a specific beam to be used, and the terminal device uses the specific beam through an indication from the network device. For example, the network device sends downlink control information to the terminal device. The downlink control information includes a TCI field. The TCI field may indicate a TCI-state, the TCI-state is used for uplink transmission or downlink transmission, and the TCI-state includes a target reference signal resource. When performing downlink transmission by using the TCI-state, the terminal device performs receiving by using a reception beam corresponding to the target reference signal resource. Because the reception beam corresponding to the target reference signal resource has been determined by the terminal device, the network device may indicate the correct reception beam to the terminal device. When performing uplink transmission by using the TCI-state, the terminal device performs transmission by using a transmission beam corresponding to the target reference signal, or performs transmission by using a reception beam corresponding to the target reference signal.

For transmission of a plurality of channels or reference signals, the network device may indicate one common beam to the terminal device for transmission, or may indicate a plurality of common beams to the terminal device for transmission. As shown in FIG. 1A, a network device (for example, a base station 1) sends one piece of DCI to a terminal device, to indicate the terminal device to use a common beam 1. The base station 1 may perform transmission with the terminal device by using the common beam 1. When the terminal device moves, the base station 1 sends one piece of DCI to the terminal device again, to indicate the terminal device to use a common beam 2 of a same type as the common beam 1. Subsequently, the terminal device replaces the previously used common beam 1 with the common beam 2, and subsequently performs transmission with the network device by using the common beam 2.

As shown in FIG. 1A, when a plurality of base stations communicate with the terminal device, for example, a base station 1 and a base station 2 each need to perform transmission with the terminal device by using one common beam. However, when the base station 1 or the base station 2 indicates a plurality of common beams of a same type to the terminal device, the terminal device cannot determine whether the indicated plurality of common beams of the same type correspond to a same base station. In this case, the terminal device usually can perform transmission by selecting only one common beam from the common beams of the same type. Consequently, the terminal device cannot simultaneously communicate with the plurality of base stations.

Therefore, this application provides a beam indication method. The method includes: First, a terminal device receives first configuration information from a network device, to configure M common beams of a same type, where M is an integer greater than 1; then, the terminal device receives first indication information from the network device, to activate N common beams in the M common beams of the same type, and indicate that the N common beams are grouped into a first common beam group and a second common beam group, where N is an integer greater than 1 and less than or equal to M; further, the terminal device receives one or more pieces of first downlink control information from the network device, where the one or more pieces of first downlink control information indicate two common beams of a same type; and finally, the terminal device may communicate with the network device by using one or two common beams based on a common beam group to which the two common beams belong. In the method, the terminal device can accurately distinguish between common beam groups to which a plurality of common beams of a same type belong, namely, corresponding network devices, to communicate with the corresponding network devices by using one or more common beams of the same type.

The following uses an example to describe in detail how the network device indicates, according to the R15/R16 protocol, reception beam information of a data transmission beam to the terminal device by using a TCI-state. The process includes TCI-state configuration, TCI-state activation, and a TCI-state indication.

The TCI-state configuration means that the network device configures a plurality of TCI-states for the terminal device by using RRC signaling. Each of these TCI-states includes a piece of QCL-Info whose type is typeD.

It should be noted that the network device may alternatively configure a plurality of TCI-states, and each of these TCI-states does not include QCL-info whose type is typeD. However, these TCI-states do not indicate the data transmission beam. Details are not described herein.

The TCI-state activation means that the network device sends a MAC-CE to the terminal device, where the MAC-CE is used to activate at least one TCI-state from the foregoing configured plurality of TCI-states. For example, as shown in FIG. 1B, eight TCI-states are activated, and the eight TCI states are in a one-to-one correspondence with eight values of a TCI field in DCI. That is, eight specific TCI-states corresponding to the eight values of the TCI field in the DCI may be determined by using MAC-CE signaling. As shown in FIG. 1B, FIG. 1B shows a structure of the MAC-CE used to activate the TCI-state. Fields $T_0$ to $T_{(N-2)\times8+7}$ respectively correspond to TCI-states whose indexes are 0 to $(N-2)\times8+7$ and that are configured in the foregoing step. A size of each field is 1 bit, and a value of the field may be 0 or 1. When the value of the field is 1, it indicates that a corresponding TCI-state is activated. When the value of the field is 0, it indicates that a corresponding TCI-state is not activated. Each MAC-CE may have eight activation fields whose values are 1, and the rest are all 0. TCI-states corresponding to the eight fields whose values are 1 are the eight TCI-states corresponding to the eight values of the TCI field in the DCI. For example, a minimum value 000 of the TCI field corresponds to an activated TCI-state with a smallest index in the MAC-CE. The rest may be deduced by analogy. The values and the TCI-states are in a one-to-one correspondence It should be noted that there are many types of MAC-CEs. In addition to the MAC-CE used for TCI-state activation, there are many MAC-CEs used for other purposes. Unless otherwise specified, embodiments of this application relate to only a MAC-CE used for TCI-state/TCI-state combination activation.

The TCI-state indication means that the network device sends DCI to the terminal device, and a TCI field in the DCI indicates a specific TCI-state. For example, a value of the TCI field in the DCI sent by the network device to the terminal device is 000, indicating a TCI-state that corresponds to 000 and that is used by the data transmission beam. Herein, referenceSignal included in QCL-Info corresponding to the type typeD in the TCI-state is a channel state information-reference signal CSI-RS whose index is #1, indicating that a beam used for data transmission is the same as a reception beam corresponding to the CSI-RS whose index is #1. The reception beam corresponding to the CSI-RS whose index is #1 may be determined through a beam measurement procedure, and is known to the terminal device. In this case, the terminal device may determine, based on a specific value of the TCI field, a reception beam corresponding to the data transmission beam, to receive data.

Figure 2:
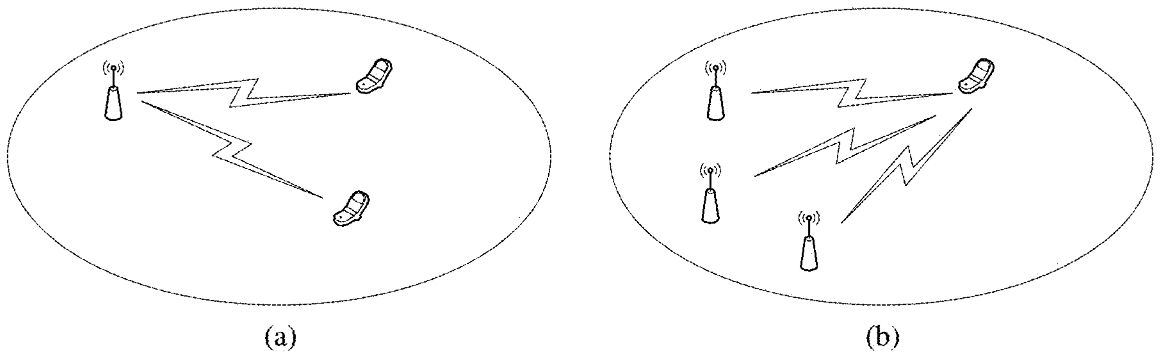
FIG. 2 is a schematic diagram of application scenarios to which two beam indication methods are applicable according to an embodiment of this application.

FIG. 2 shows a possible application scenario to which a beam indication method provided in an embodiment of this application is applicable. As shown in (a) in FIG. 2, a communication system includes one network device, where the network device may send data or control signaling to one or more terminal devices. As shown in (b) in FIG. 2, a plurality of network devices may simultaneously send data or control signaling to one terminal device.

The network device in embodiments of this application may be a device in a wireless network. For example, the network device may be a device deployed in a radio access network to provide a wireless communication function for the terminal device. For example, the network device may be a radio access network (RAN) node that connects the terminal device to a wireless network, and may also be referred to as an access network device.

The network device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network device may be a network device in a 5G mobile communication system, for example, a next generation NodeB (gNB), a transmission and reception point (TRP), or a TP in an NR system; or one antenna panel or a group of antenna panels (including a plurality of antenna panels) of a base station in the 5G mobile communication system. Alternatively, the network device may be a network node that forms a gNB or a transmission point, for example, a BBU or a distributed unit (DU).

In some deployments, the gNB may include a central unit (CU) and a DU. The gNB may further include an active antenna unit (AAU). The CU performs some functions of the gNB, and the DU performs some functions of the gNB. For example, the CU is responsible for processing a non-real-time protocol and a service, and performing functions of a radio resource controller RRC layer and a packet data convergence protocol (PDCP) layer. The DU is responsible for processing a physical layer protocol and a real-time service, and performing functions of a radio link control (RLC) layer, a MAC layer, and a physical (PHY) layer. The AAU implements some physical layer processing functions, radio frequency processing, and a function related to an active antenna. Information at the RRC layer is finally changed to information at the PHY layer, or is changed from information at the PHY layer. Therefore, in this architecture, higher layer signaling (for example, RRC layer signaling) may also be considered to be sent by the DU, or sent by the DU and the AAU. It may be understood that the network device may be a device including one or more of a CU node, a DU node, and an AAU node. In addition, the CU may be classified as a network device in a RAN, or a network device in a core network (CN). This is not limited in this application.

The terminal device in embodiments of this application may be a wireless terminal device that can receive scheduling and indication information from the network device. The terminal device may be a device that provides a user with voice and/or data connectivity, a handheld device having a wireless connection function, or another processing device connected to a wireless modem.

The terminal device is also be referred to as user equipment (UE), a mobile station (MS), a mobile terminal (MT), or the like. The terminal device is a device including a wireless communication function (providing a user with a voice/data connectivity), for example, a handheld device or a vehicle-mounted device having a wireless connection function. Currently, for example, the terminal device is a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in the vehicle to everything, a wireless terminal in self-driving, a wireless terminal in remote medical surgery, a wireless terminal in a smart grid, a wireless terminal in transportation safety, a wireless terminal in a smart city, a wireless terminal in a smart home, or the like. For example, the wireless terminal in the vehicle to everything may be a vehicle-mounted device, an entire vehicle device, a vehicle-mounted module, a vehicle, or the like. The wireless terminal in industrial control may be a camera, a robot, or the like. The wireless terminal in the smart home may be a television, an air conditioner, a sweeper, a sound box, a set-top box, or the like.

It should be noted that the beam indication method provided in embodiments of this application may be applied to various communication systems, such as a 5G system, a new radio (NR) system, a long term evolution (LTE) system, an LTE frequency division duplex (FDD) system, an LTE time division duplex (TDD) system, a universal mobile telecommunications system (UMTS), a mobile communication system after a 5G network (for example, a 6G mobile communication system), and a vehicle to everything (V2X) communication system.

Figure 3:
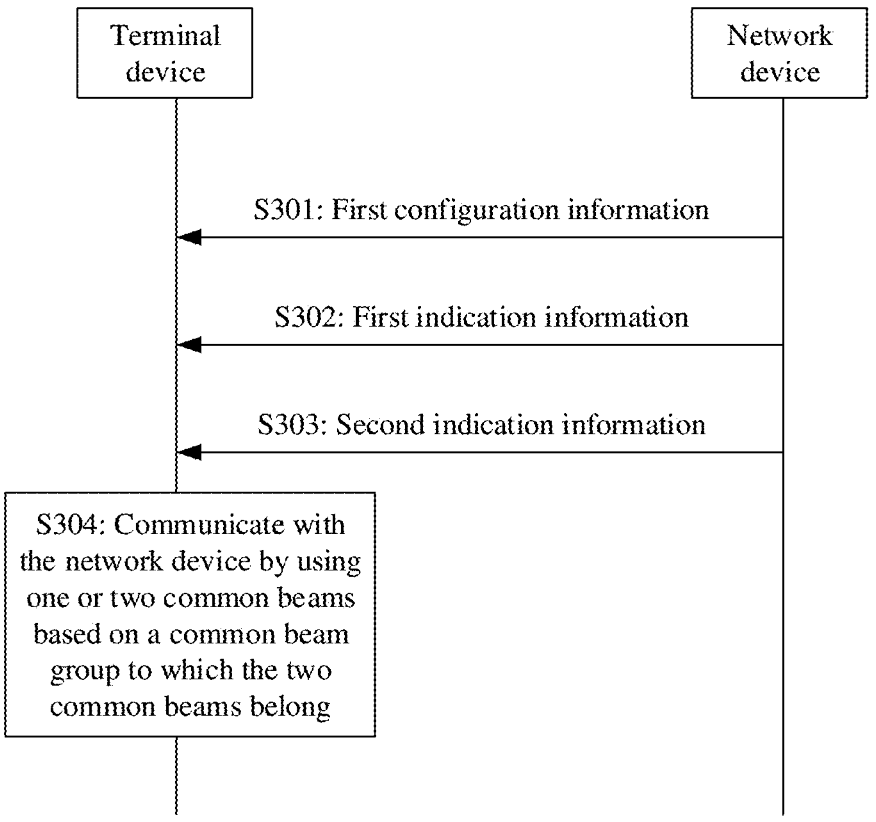
FIG. 3 is a schematic flowchart of a beam indication method according to an embodiment of this application.

FIG. 3 is a flowchart of a beam indication method according to an embodiment of this application. The method provided in this embodiment of this application may be applied to, but is not limited to, the application scenario shown in FIG. 2. As shown in FIG. 3, a procedure of the method includes the following steps.

S301: A network device sends first configuration information to a terminal device, where the first configuration information is used to configure M common beams of a same type, and M is an integer greater than 1.

Correspondingly, the terminal device receives the first configuration information from the network device.

Optionally, the first configuration information may be RRC signaling.

It should be noted that the common beam in this application may include three types of common beams: an uplink common beam, a downlink common beam, and an uplink and downlink common beam. In this application, the common beams of the same type are not limited to a specific type. In other words, this solution is applicable to all types of common beams.

S302: The network device sends first indication information to the terminal device, where the first indication information is used to activate N common beams in the M common beams of the same type, and indicates that the N common beams are grouped into a first common beam group and a second common beam group, and N is an integer greater than 1 and less than or equal to M.

Correspondingly, the terminal device receives the first indication information from the network device.

Optionally, the first indication information may be first MAC-CE signaling. The network device may send one piece of first MAC-CE signaling to the terminal device, to activate the N common beams in the M common beams of the same type. Alternatively, the network device may send two pieces of first MAC-CE signaling to the terminal device, where one piece of MAC-CE signaling is used to activate the first common beam group, and the other piece of MAC-CE signaling is used to activate the second common beam group.

It should be noted that, in this application, the N common beams in the M common beams of the same type may be activated by using MAC-CE signaling, or the N common beams may be activated by using other signaling or in another manner. This is not specifically limited in this application.

In an implementation, the N common beams activated by using one piece of first MAC-CE signaling are grouped into the first common beam group and the second common beam group, which may specifically include but is not limited to the following two grouping manners.

In a first grouping manner, the first common beam group includes a first half of the N common beams, and the second common beam group includes a second half of the N common beams; or the first common beam group includes a second half of the N common beams, and the second common beam group includes a first half of the N common beams.

In a second grouping manner, the first common beam group includes a common beam whose sequence number is an odd number in the N common beams, and the second common beam group includes a common beam whose sequence number is an even number in the N common beams; or the first common beam group includes a common beam whose sequence number is an even number in the N common beams, and the second common beam group includes a common beam whose sequence number is an odd number in the N common beams.

It should be noted that, in this application, a manner of grouping the N activated common beams into the first common beam group and the second common beam group is not limited to the foregoing two grouping manners, and may alternatively include another grouping manner. For details, refer to a specific embodiment. Details are not described herein again.

In addition, in step S302, after the common beams are activated by using the first indication information, the first indication information indicates grouping of the activated common beams, or second indication information described below may indicate grouping of the activated common beams, or other similar indication information indicates grouping of the activated common beams. This is not specifically limited in this application. In addition, in step S302, the configured M common beams of the same type may be alternatively grouped first, and then the grouped common beams are activated. This is not specifically limited in this application.

S303: The network device sends second indication information to the terminal device, where the second indication information indicates two common beams.

Correspondingly, the terminal device receives the second indication information from the network device.

Optionally, the two common beams respectively belong to the first common beam group and the second common beam group, or the two common beams both belong to the first common beam group, or the two common beams both belong to the second common beam group. It should be understood that, in this application, the two common beams are common beams of a same type.

If the two common beams belong to different common beam groups, the terminal device communicates with the network device by using the two common beams. If the two common beams belong to a same common beam group, the terminal device communicates with the network device by using one of the two common beams, for example, by using a common beam that is indicated later or that takes effect later in the two common beams.

It should be noted that, generally, after the terminal device receives the second indication information to indicate a common beam, the common beam takes effect only after a period of time. Therefore, the common beam that takes effect later described above is a beam whose effective time is later.

In an implementation, that the network device sends the second indication information to the terminal device may specifically include the following two cases.

In a first case, the second indication information includes two pieces of first downlink control information, namely, a first piece of first downlink control information and a second piece of first downlink control information, and each piece of first downlink control information indicates one of the two common beams.

Optionally, the first piece of first downlink control information and the second piece of first downlink control information may be DCI signaling.

Based on the first case, each piece of first downlink control information may be configured in the following two forms.

In a first form, each piece of first downlink control information may include a single TCI field, and the single TCI field in each piece of first downlink control information corresponds to the first common beam group or the second common beam group. To be specific, common beams corresponding to all field values of the TCI field all belong to the first common beam group, or common beams corresponding to all field values of the TCI field all belong to the second common beam group.

Specifically, a manner of determining whether common beams corresponding to the TCI field in each piece of first downlink control information belong to the first common beam group or the second common beam group may specifically include but is not limited to the following indication manners.

In a first indication manner, a first field in the first downlink control information may indicate that common beams corresponding to field values of the TCI field all belong to the first common beam group or the second common beam group.

The first field in each piece of first downlink control information is different from the TCI field in the first downlink control information, and may be a preset dedicated field.

For example, the first piece of first downlink control information includes one first TCI field. A preset field in the first piece of first downlink control information indicates that common beams corresponding to field values of the first TCI field all belong to the first common beam group, or a preset field in the first piece of first downlink control information indicates that common beams corresponding to field values of the first TCI field all belong to the second common beam group.

In a second indication manner, some bits of the TCI field in the first downlink control information may indicate that common beams indicated by the TCI field all belong to the first common beam group or the second common beam group.

For example, the first piece of first downlink control information includes one first TCI field, and a length of the first TCI field is 4 bits. A first bit indicates whether a common beam indicated by the TCI field belongs to the first common beam group or the second common beam group. The remaining three bits indicate specific common beams.

In a third indication manner, a control resource set group identifier corresponding to the first downlink control information may indicate that common beams indicated by the TCI field in the downlink control information all belong to the first common beam group or the second common beam group. Specifically, the common beam group is associated with a specific control resource set group identifier. Therefore, the first common beam group and the second common beam group are respectively associated with different control resource set group identifiers. In addition, the first downlink control information is also associated with a specific control resource set group identifier. Therefore, the first piece of first downlink control information and the second piece of first downlink control information are respectively associated with different control resource set group identifiers. The first downlink control information associated with a same control resource set group identifier corresponds to a common beam group. A common beam indicated by one piece of first downlink control information belongs to a common beam group corresponding to the first downlink control information. That the first downlink control information is also associated with a specific control resource set group identifier may be understood as that the first downlink control information is carried on a PDCCH corresponding to a control resource set corresponding to the specific control resource set group identifier.

For example, if a control resource set group identifier corresponding to one piece of first downlink control information is 0, common beams indicated by the TCI field in the first downlink control information all belong to the first common beam group; or if a control resource set group identifier corresponding to one piece of first downlink control information is 1, common beams indicated by the TCI field in the first downlink control information all belong to the second common beam group.

In the foregoing three indication manners, when performing the following step S303, the terminal device may determine, based on a first field or some bits of the TCI field or a corresponding control resource set group identifier in each piece of first downlink control information, whether the indicated common beams belong to the first common beam group or the second common beam group.

For example, the network device sends the second indication information to the terminal device based on the first form. The second indication information includes two pieces of first downlink control information, namely, the first piece of first downlink control information and the second piece of first downlink control information.

The terminal device determines, based on a first field or some bits of a TCI field or a corresponding control resource set group identifier in the first piece of first downlink control information, that the TCI field in the first piece of first downlink control information corresponds to the first common beam group. The terminal device determines, based on a first field or some bits of a TCI field or a corresponding control resource set group identifier in the second piece of first downlink control information, that the TCI field in the second piece of first downlink control information corresponds to the second common beam group.

In this case, after receiving the two pieces of first downlink control information, if the terminal device determines that one field value of the TCI field in the first piece of first downlink control information indicates one of the two common beams, and one field value of the TCI field in the second piece of first downlink control information indicates the other of the two common beams, the terminal device may determine that the indicated two common beams respectively belong to the first common beam group and the second common beam group. In this way, the terminal device separately communicates with corresponding network devices by using the two common beams.

After receiving the two pieces of first downlink control information, if the terminal device determines that two field values of the TCI field in the first piece of first downlink control information respectively indicate the two common beams, the terminal device determines that the two common beams both belong to the first common beam group. Alternatively, after receiving the two pieces of first downlink control information, if the terminal device determines that two field values of the TCI field in the second piece of first downlink control information respectively indicate the two common beams, the terminal device determines that the two common beams both belong to the second common beam group. In this way, when the terminal device determines that the two common beams both belong to a same common beam group (the first common beam group or the second common beam group), the terminal device communicates with the network device by using one of the two common beams.

In a second form, each piece of first downlink control information includes a single transmission configuration indicator TCI field, all field values of the TCI field are divided into two parts, a common beam corresponding to field values in a first part of the two parts belongs to the first common beam group, and a common beam corresponding to field values in a second part of the two parts belongs to the second common beam group.

For example, one piece of first downlink control information includes one first TCI field, the first TCI field includes eight field values, and the eight field values are divided into two parts. Common beams corresponding to field values in one part all belong to the first common beam group, and common beams corresponding to field values in the other part belong to the second common beam group. For example, common beams indicated by the field values in the first part all belong to the first common beam group, and common beams indicated by the field values in the second part all belong to the second common beam group; or common beams indicated by the field values in the first part all belong to the second common beam group, and common beams indicated by the field values in the second part all belong to the first common beam group.

Specifically, a manner of dividing all field values of the TCI field in each piece of first downlink control information into two parts may include but is not limited to the following three division manners.

In a first division manner, a first half of all the field values of the TCI field are used as the field values in the first part, and a second half of all the field values of the TCI field are used as the field values in the second part.

In a second division manner, even field values in all the field values of the TCI field are used as the field values in the first part, and odd field values in all the field values of the TCI field are used as the field values in the second part.

In a third division manner, the first S field values in all the field values of the TCI field are used as the field values in the first part, and remaining field values other than the first S field values in all the field values of the TCI field are used as the field values in the second part, where S is a positive integer greater than 0.

In this embodiment of this application, a value of S is equal to a quantity of beams in the first common beam group or a quantity of beams in the second common beam group; or a value of S is indicated by fourth indication information, where the fourth indication information may be second configuration information, second MAC-CE information, or second downlink control information; or a value of S may be a value agreed upon between the terminal device and the network device. This is not specifically limited in this application.

It should be noted that the second configuration information may be RRC signaling, and the second configuration information and the first configuration information are information of a same type. The second configuration information is the first configuration information, or configuration information different from the first configuration information, or other configuration information. Similarly, the second MAC-CE signaling may be the same as or different from the first MAC-CE signaling included in the first indication information. This is not specifically limited in this application.

In this case, when the terminal device performs S304 based on the second form, the terminal device determines a specific field value that is in the downlink control information and that corresponds to the two common beams indicated by the second indication information, and then determines, based on field values in a specific part corresponding to the field value and further based on a specific common beam group corresponding to field values in the specific part, the specific common beam group to which the two common beams belong.

For example, the terminal device receives two pieces of DCI signaling, namely, DCI1 signaling and DCI2 signaling, from the network device. The DCI1 signaling indicates a first common beam, and the DCI2 signaling indicates a second common beam. If the terminal device determines that the first common beam corresponds to field values that are in a first part and that are of a TCI field in the DCI1 signaling, and common beams corresponding to the field values that are in the first part and that are of the TCI field in the DCI1 signaling all belong to the first common beam group, the terminal device may determine that the first common beam indicated by the DCI1 signaling belongs to the first common beam group. If the terminal device determines that the second common beam corresponds to field values that are a second part and that are of a TCI field in the DCI2 signaling, and common beams corresponding to the field values that are the second part and that are of the TCI field in the DCI2 signaling all belong to the second common beam group, the terminal device may determine that the second common beam indicated by the DCI2 signaling belongs to the second common beam group. In this case, the terminal device determines that the first common beam and the second common beam are not in a same common beam group, so that the terminal device separately communicates with corresponding network devices by using the two common beams.

It should be understood that the first common beam and the second common beam are the two common beams indicated by the second indication information.

In a second case, the second indication information includes one piece of first downlink control information, and the first downlink control information indicates the two common beams.

Based on the second case, the first downlink control information may be configured in the following two forms.

In a first form, the first downlink control information includes two TCI fields, a common beam indicated by one of the two TCI fields belongs to the first common beam group, and a common beam indicated by the other of the two TCI fields belongs to the second common beam group.

Optionally, the first downlink control information includes the two TCI fields only when a first condition is met. The first downlink control information includes only one TCI field in the downlink control information when a first condition is not met.

The first condition may include but is not limited to any one or more of the following conditions.

(1) Two common beam sets of a same type are configured in the first configuration information.

It should be noted that the two common beam sets of the same type may be related to the first common beam group and the second common beam group, that is, one common beam group corresponds to a subset of one common beam set. Alternatively, the two common beam sets of the same type may be unrelated to the first common beam group and the second common beam group.

(2) In configuration of the first configuration information, common beams of a same type are divided into two parts that are respectively configured in the two sets.

For example, for eight uplink common beams, the eight uplink common beams are divided into two parts, uplink common beams in a first part are configured in a first set, and uplink common beams in a second part are configured in a second set. For eight downlink common beams, the eight downlink common beams are also divided into two parts, downlink common beams in a first part may also be configured in the first set, and downlink common beams in a second part may be configured in the second set. For eight uplink and downlink common beams, the eight uplink and downlink common beams are also divided into two parts, uplink and downlink common beams in a first part may be configured in the first set, and uplink and downlink common beams in a second part may be configured in the second set. Therefore, each of the two sets may include but is not limited to common beams of one type, or may include common beams of a plurality of types. In addition, the two sets may be correspondingly used by two network devices.

It should be noted that the first common beam group and the second common beam group may be respectively subsets of the two sets. For example, the first common beam group is a subset of the first set, and the second common beam group is a subset of the second set.

(3) The first configuration information includes third indication information, where the third indication information indicates that a quantity of field values included in the first downlink control information is 2, or the third indication information indicates that there are the two TCI fields in the first downlink control information, or the third indication information indicates that the terminal device needs to use or maintain two common beams of a same type.

For example, the third indication information may include a value of a first parameter. For example, when the value of the first parameter is 2, the third indication information indicates that the quantity of field values included in the first downlink control information is 2. Alternatively, when the value of the first parameter is 1, the third indication information indicates that there are the two TCI fields in the first downlink control information. Alternatively, when the value of the first parameter is 1, the third indication information indicates that the terminal device needs to use or maintain the two common beams of the same type.

It should be noted that when the condition (3) is used as the first condition, the value of the first parameter is 1, and the third indication information indicates that there are the two TCI fields in the first downlink control information. However, when the condition (3) is not used as the first condition, the value of the first parameter may alternatively be 0, and the third indication information may alternatively indicate that there are no two TCI fields in the first downlink control information.

Similarly, when the condition (3) is used as the first condition, the value of the first parameter is 1, and the third indication information indicates that the terminal device needs to use or maintain the two common beams of the same type. However, when the condition (3) is not used as the first condition, the value of the first parameter may alternatively be 0, and the third indication information may alternatively indicate that the terminal device does not need to use or maintain the two common beams of the same type.

In this case, the terminal device first determines, based on the first form, whether the first configuration information in step S301 meets the first condition. If the first configuration information meets the first condition, it indicates that the received downlink control information includes the two TCI fields, a first TCI field corresponds to the first common beam group, and a second TCI field corresponds to the second common beam group. When the following step S304 is performed, the method may specifically include:

If the two common beams indicated by the first downlink control information are specifically respectively indicated by the first TCI field and the second TCI field in the first downlink control information, the terminal device may determine that the two common beams respectively belong to the first common beam group and the second common beam group. In this case, the terminal device separately communicates with corresponding network devices by using the two common beams.

If the two common beams indicated by the first downlink control information are indicated by a same TCI field in the first downlink control information, the terminal device may determine that the two common beams belong to a same common beam group, namely, the first common beam group or the second common beam group. In this case, the terminal device communicates with the network device by using one common beam.

For example, when the terminal device receives one piece of DCI signaling from the network device, the terminal device first determines whether the first configuration information received in step S301 meets the first condition. If the first configuration information meets the first condition, it indicates that the DCI signaling includes two TCI fields. To be specific, a first TCI field corresponds to the first common beam group (where the first common beam group corresponds to a first network device), and a second TCI field corresponds to the second common beam group (where the second common beam group corresponds to a second network device). Further, the terminal device determines that the first TCI field indicates a first common beam, and the second TCI field indicates a second common beam, to determine that the first common beam and the second common beam respectively belong to the first common beam group and the second common beam group, in other words, are not in a same common beam group. When performing the following step S304, the terminal device communicates with the first network device by using the first common beam, and communicates with the second network device by using the second common beam.

It should be understood that the first common beam and the second common beam are the two common beams indicated by the second indication information.

In a second form, the first downlink control information includes a single TCI field, a field value of the TCI field may directly indicate the two common beams, and the two common beams respectively belong to the first common beam group and the second common beam group. It should be understood that the field value of the TCI field may be a preset or specified field value.

It should be noted that, in the second form, in addition to a case that the field value of the TCI field may indicate both the two common beams, two field values of the TCI field may alternatively indicate the two common beams respectively. This is not specifically limited in this application.

When the terminal device performs the following step S304 based on the second form, provided that the terminal device determines that the received downlink control information includes the field value of the TCI field, the terminal device may determine that the two common beams indicated by the field value respectively belong to the first common beam group and the second common beam group, and then may separately communicate with the corresponding network devices by using the two common beams.

For example, when determining to use the two common beams of a same type (namely, the first common beam and the second common beam) to perform communication, the network device sends one piece of DCI signaling to the terminal device, and indicates, by using a field value of a TCI field in the DCI signaling, the terminal device to use the two common beams of the same type. Then, the terminal device separately communicates with the corresponding network devices by using the two common beams of the same type that are indicated by the DCI signaling.

S304: The terminal device communicates with the network device by using one or two common beams based on a common beam group to which the two common beams belong.

In an implementation, that the terminal device communicates with the network device by using one or two common beams based on a common beam group to which the two common beams belong may specifically include the following two communication cases.

In a first communication case, when the terminal device determines that the two common beams respectively belong to the first common beam group and the second common beam group, the terminal device communicates with network devices by using the two common beams.

For example, the terminal device determines that the first common beam belongs to the first common beam group, the second common beam belongs to the second common beam group, the first common beam group is correspondingly used by the first network device, and the second common beam group is correspondingly used by the second network device. In this case, the terminal device communicates with the first network device by using the first common beam, and communicates with the second network device by using the second common beam.

In a second communication case, when the terminal device determines that the two common beams both belong to the first common beam group or both belong to the second common beam group, the terminal device communicates with the network device by using one of the two common beams. For example, the terminal device communicates with the network device by using a common beam that is indicated later or that takes effect later in the two common beams.

For example, if the terminal device determines that the first common beam and the second common beam both belong to a same common beam group, and indication time or effective time of the second common beam is later, the terminal device communicates with the network device by using the second common beam.

It should be noted that each of the common beam groups obtained through grouping in step S302 usually corresponds to one network device. When the terminal device determines that the two common beams of the same type belong to a same common beam group, the terminal device needs to perform communication by using only one of the two common beams.

In conclusion, this application provides the beam indication method. The method includes: First, the terminal device receives the first configuration information from the network device, to configure the M common beams of the same type, where M is an integer greater than 1; then, the terminal device receives the first indication information from the network device, to activate the N common beams in the M common beams of the same type, and indicate that the N common beams are grouped into the first common beam group and the second common beam group, where N is an integer greater than 1 and less than or equal to M; further, the terminal device receives one or more pieces of first downlink control information from the network device, where the one or more pieces of first downlink control information indicate the two common beams of the same type, and each common beam belongs to the first common beam group or the second common beam group; and finally, the terminal device may communicate with the network device by using one or two common beams based on the common beam group to which the two common beams belong. In the method, the terminal device can accurately distinguish between common beam groups to which a plurality of common beams of a same type belong, namely, corresponding network devices, to communicate with the corresponding network devices by using one or more common beams of the same type.

Figure 4:
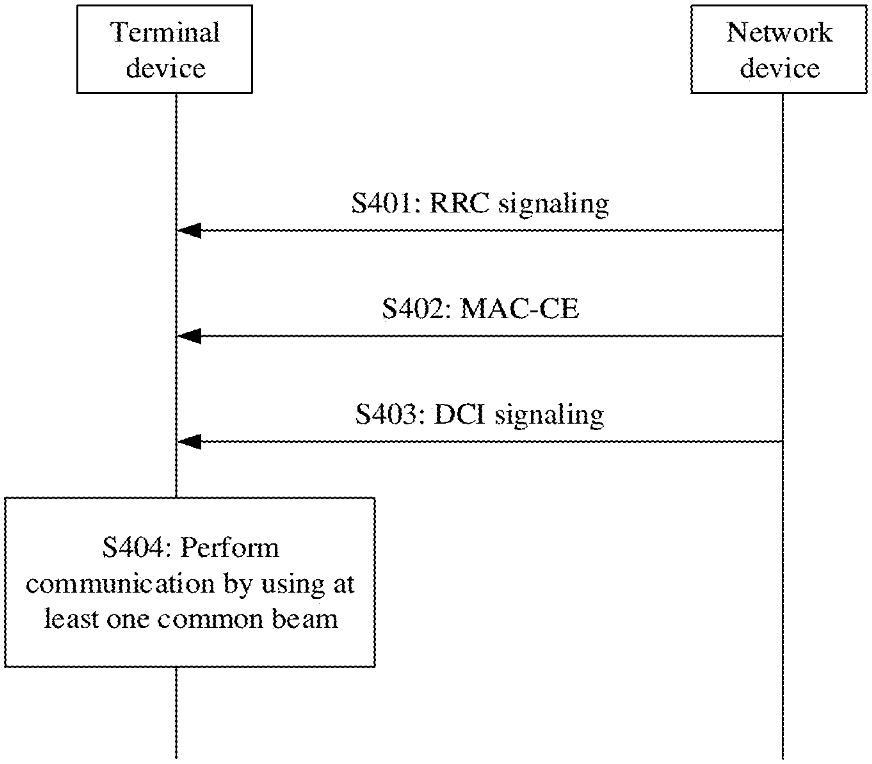
FIG. 4 is a schematic flowchart of a specific example of a beam indication method according to an embodiment of this application.

Based on the beam indication method provided in the foregoing embodiment, this application further provides the following specific embodiment according to the method, to describe in detail the technical solutions of this application. As shown in FIG. 4, a specific method procedure in the embodiment is described below.

S401: A network device sends RRC configuration signaling to a terminal device.

Correspondingly, the terminal device receives the RRC configuration signaling. The RRC configuration signaling may be used to configure M common beams of a same type, where M is an integer greater than 1.

Optionally, the RRC configuration signaling may include but is not limited to one or more of the following common beam-related configuration information:

(1) information about one or more types of common beams, for example, an index or an identifier of a common beam;
(2) information about a correspondence between a common beam set and the network device (for example, a base station);
(3) a quantity of common beam sets of a same type; and
(4) a second parameter, where the second parameter is used to configure a quantity of common beams of a same type that can be used by the terminal device. Specifically, the second parameter is used to configure a quantity of downlink common beams that can be used by the terminal device, or the second parameter is used to configure a quantity of uplink common beams that can be used by the terminal device, or the second parameter is used to configure a quantity of uplink and downlink common beams that can be used by the terminal device.

For example, when a quantity of downlink common beam sets configured by the network device for the terminal device is 2, the terminal device needs to simultaneously use two downlink common beams or simultaneously make two downlink common beams take effect. When a quantity of uplink common beam sets configured by the network device for the terminal device is 2, the terminal device needs to simultaneously use two uplink common beams or simultaneously make two uplink common beams take effect. When a quantity of uplink and downlink common beam sets configured by the network device for the terminal device is 2, the terminal device needs to simultaneously use two uplink and downlink common beams or simultaneously make two uplink and downlink common beams take effect.

It should be noted that in step S401, one network device may send one or more pieces of RRC configuration signaling to the terminal device, to configure the M common beams of the same type for the terminal device, or a plurality of network devices may separately send one piece of RRC configuration signaling to the terminal device, to configure the M common beams of the same type for the terminal device. This may not be specifically limited in this application. In addition, in practice, the network device may further configure different types of common beams for the terminal device by using the RRC configuration signaling.

In this embodiment, the M common beams of the same type may be configured in a same common beam set, or may be configured in different common beam sets. When common beams of different network devices (for example, base stations) are configured in different sets, the terminal device may distinguish between the network devices (base stations) corresponding to the different common beam sets. When different common beams are configured in the different sets, because indexes of the common beams in the different common beam sets are different, the terminal device may determine, based on an index of a specific common beam, a common beam set corresponding to the common beam. In addition, the terminal device may further determine, based on the quantity of common beam sets of the same type, a quantity of common beams that need to be used, or a quantity of common beams of the type that can take effect simultaneously. For example, when the configuration information includes two downlink common beam sets, the terminal device may determine that two downlink common beams need to be used.

In addition, the common beam in this embodiment may be an uplink common beam, a downlink common beam, or an uplink and downlink common beam. A type of the common beam is not specifically limited in this application.

For example, the network device sends the RRC configuration signaling to the terminal device. The RRC configuration signaling is used to configure M TCI-states, namely, M downlink beams, where M is an integer greater than 1. Each of the M TCI-states includes one piece of QCL-Info whose type is typeD.

It should be understood that step S401 corresponds to step S301 in FIG. 3, and mutual reference may be made to the two steps. For example, the RRC configuration signaling in step S401 is the first configuration information in step S301.

S402: The network device sends MAC-CE signaling to the terminal device.

Correspondingly, the network device receives the MAC-CE signaling.

Specifically, the first MAC-CE signaling is used to activate N common beams from the configured M common beams of the same type, and indicates that the N common beams are grouped into a first common beam group and a second common beam group, where N is an integer greater than 1 and less than or equal to M.

It should be noted that, in step S302, after the network device configures different types of common beams for the terminal device, if the network device sends the MAC-CE signaling to the terminal device, the MAC-CE signaling may be used to activate only a common beam of one type from the configured different types of common beams, or may be used to activate common beams of a plurality of types. After common beams of a same type are activated from the configured different types of common beams, the MAC-CE signaling may further indicate that the activated common beams of the same type are grouped into two groups, namely, the first common beam group and the second common beam group. For example, eight uplink common beams are activated by using the MAC-CE signaling. The eight uplink common beams are grouped into two common beam groups, and each first common beam group corresponds to one network device, for example, a base station.

In addition, in this embodiment of this application, activated common beams of a same type are grouped into two groups for description. Subsequently, the common beams may be further grouped into three groups, four groups, or the like based on a quantity of network devices that the terminal device actually communicates with. Details are not described herein again.

When receiving DCI signaling from the network device, the terminal device may determine a specific common beam group to which a common beam indicated by the DCI signaling belongs, to determine a network device (for example, a base station) corresponding to the indicated common beam group.

For example, the network device sends RRC signaling to the terminal device, where the RRC signaling indicates to configure a common beam set for the terminal device, and the common beam set includes 64 common beams of a same type. Then, the network device sends the MAC-CE signaling to the terminal device, where the MAC-CE signaling indicates to activate the eight common beams from the common beam set, and the eight common beams respectively correspond to eight field values of a TCI field in the DCI signaling. In this case, when the DCI signaling received by the terminal device indicates one of the eight field values, the terminal device may determine, based on a correspondence between the eight activated common beams and the eight field values of the TCI field in the DCI signaling, a specific common beam indicated by the DCI signaling.

Specifically, the MAC-CE signaling further indicates a manner of grouping the N activated common beams. The manner may specifically include but is not limited to the following grouping manners.

In a first grouping manner, common beams of a same type are equally grouped into two groups. To be specific, a first half of the N common beams are used as the first common beam group, and a second half of the N common beams are used as the second common beam group.

For example, the activated common beams include four downlink common beams, namely, a downlink common beam #1, a downlink common beam #2, a downlink common beam #3, and a downlink common beam #4. In this case, the downlink common beam #1 and the downlink common beam #2 are used as the first common beam group, and the downlink common beam #3 and the downlink common beam #4 are used as the second common beam group.

In a second grouping manner, the common beams are grouped based on parity of sequence numbers of the common beams. To be specific, a common beam whose sequence number is an odd number is used as the first common beam group, and a common beam whose sequence number is an even number is used as the second common beam group; or a common beam whose sequence number is an even number is used as the first common beam group, and a common beam whose sequence number is an odd number is used as the second common beam group.

For example, the activated common beams include four downlink common beams, and the four downlink common beams are arranged as follows: a downlink common beam #1, a downlink common beam #2, a downlink common beam #3, and a downlink common beam #4. In this case, the downlink common beam #1 and the downlink common beam #3 whose sequence numbers are odd numbers are used as the first common beam group, and the downlink common beam #2 and the downlink common beam #4 whose sequence numbers are even numbers are used as the second common beam group.

In a third grouping manner, for each activated common beam, a field in the MAC-CE signaling indicates a group corresponding to the common beam. For example, 1 bit is used for an indication. When a bit value in the MAC-CE signaling corresponding to the common beam is 0, it indicates that the common beam corresponds to the first common beam group; or when a bit value in the MAC-CE signaling corresponding to the common beam is 1, it indicates that the common beam corresponds to the second common beam group.

For example, the activated common beams include four downlink common beams, namely, a downlink common beam #1, a downlink common beam #2, a downlink common beam #3, and a downlink common beam #4. If bit values in the MAC-CE signaling corresponding to the downlink common beam #1, the downlink common beam #2, and the downlink common beam #3 are all 0, and a bit value in the MAC-CE signaling corresponding to the downlink common beam #4 is 1, the downlink common beam #1, the downlink common beam #2, and the downlink common beam #3 are used as the first common beam group, and the downlink common beam #4 is used as the second common beam group.

In a fourth grouping manner, first X common beams are used as the first common beam group, and last Y common beams are used as the second common beam group. Quantities of X and Y may be separately indicated by a field in a MAC-CE. Alternatively, if X+Y is a fixed value, a field in the MAC-CE signaling indicates a value of one of X and Y, and the terminal device may also obtain a value of the other of X and Y through calculation.

For example, the activated common beams include four downlink common beams, namely, a downlink common beam #1, a downlink common beam #2, a downlink common beam #3, and a downlink common beam #4. If a first field in the MAC-CE signaling indicates that X is 3, and a second field in the MAC-CE indicates that Y is 1, the three downlink common beams, namely, the downlink common beam #1, the downlink common beam #2, and the downlink common beam #3 are used as the first common beam group, and the downlink common beam #4 is used as the second common beam group. Alternatively, when it is determined that a total quantity of downlink common beams is 4, a field in the MAC-CE signaling indicates that X is 3, and the terminal device may obtain, through calculation, that Y is 1. In this case, the three downlink common beams, namely, the downlink common beam #1, the downlink common beam #2, and the downlink common beam #3 are used as the first common beam group, and the downlink common beam #4 is used as the second common beam group.

It should be noted that, when the MAC-CE signaling indicates both an uplink common beam and a downlink common beam, one uplink common beam and one downlink common beam may be bound together as a common beam pair. Further, grouping is performed on a plurality of common beam pairs by using the MAC-CE signaling.

It should be understood that the common beam pair in this embodiment of this application is merely for ease of description, but is not limited to that each common beam pair needs to include one uplink common beam and one downlink common beam. One common beam pair may include only one uplink common beam, or may include only one downlink common beam. The common beam pair is not specifically limited in this application.

In addition, in this embodiment of this application, to simplify a name, a group of common beams is referred to as the first common beam group, and a group of common beam pairs is referred to as the second common beam group.

For example, in this application, a manner of grouping common beam pairs by using the MAC-CE signaling may specifically include but is not limited to the following several manners.

In a first grouping manner, all common beam pairs are equally grouped into two groups, namely, a first half of the common beam pairs belong to one group, and a second half of the common beam pairs belong to the other group. For details, refer to the foregoing first grouping manner of grouping the common beams. Details are not described herein again.

In a second grouping manner, grouping is performed based on parity of index sequence numbers of all common beam pairs. To be specific, a common beam pair whose index sequence number is an odd number is used as one group, and a common beam pair whose index sequence number is an even number is used as the other group. For details, refer to the foregoing second grouping manner of grouping the common beams. Details are not described herein again.

In a third grouping manner, for each common beam pair, a field in the MAC-CE signaling indicates a group corresponding to the common beam pair. For example, 1 bit is used for an indication. When a bit value in the MAC-CE signaling corresponding to the common beam pair is 0, it indicates that the common beam pair corresponds to a first group; or when a bit value in the MAC-CE signaling corresponding to the common beam pair is 1, it indicates that the common beam pair corresponds to a second group. For details, refer to the foregoing third grouping manner of grouping the common beams. Details are not described herein again.

In a fourth grouping manner, first Z common beam pairs are used as a first group, and last W common beam pairs are used as a second group. Quantities of Z and W may be separately indicated by a field in a MAC-CE. Alternatively, if Z+W is a fixed value, a field in the MAC-CE signaling indicates a value of one of Z and W, and the terminal device may also obtain a value of the other of Z and W through calculation. For details, refer to the foregoing fourth grouping manner of grouping the common beams. Details are not described herein again.

It should be noted that, in each of the foregoing manners, a common beam set may be activated by using one piece of MAC-CE signaling, to obtain a plurality of groups of common beams (each group of common beams may be represented as the first common beam group) or a plurality of groups of common beam pairs (each group of common beam pairs may be represented as the second common beam group).

Each common beam group or a plurality of groups of common beam pairs may respectively correspond to different DCI signaling, or correspond to different TCI fields in same DCI signaling, or correspond to different field values of a same TCI field. In this way, based on such a mapping relationship, in the following step S403, the terminal device receives the DCI signaling from the network device, and may determine, by using the DCI signaling, a specific common beam group to which an indicated common beam belongs.

In an implementation of this application, a group of common beams or a group of common beam pairs may be alternatively activated separately by using a plurality of pieces of MAC-CE signaling. For example, the terminal device may receive two pieces of MAC-CE signaling from the network device, and separately activate a group of common beams or a group of common beam pairs by using the two pieces of MAC-CE signaling. In addition, a plurality of groups of common beams or common beam pairs respectively activated by using the plurality of pieces of MAC-CE signaling respectively correspond to different DCI signaling, or correspond to different TCI fields in same DCI signaling, or correspond to different field values of a same TCI field. In this way, the terminal device may determine, by using a logical channel identifier of the MAC-CE signaling or a first field in the MAC-CE signaling, DCI signaling or TCI fields in same DCI signaling or some corresponding field values of a same TCI field corresponding to a group of common beams or common beam pairs activated by using different MAC-CE signaling.

It should be noted that, in this application, the terminal device may receive a plurality of pieces of MAC-CE signaling from a same network device, or may separately receive one piece of MAC-CE signaling from a plurality of network devices. This is not specifically limited in this application.

S403: The network device sends the DCI signaling to the terminal device, where the DCI signaling indicates two common beams.

Correspondingly, the terminal device receives the DCI signaling.

It should be noted that, in this embodiment of this application, the DCI signaling indicates that the two common beams are common beams of a same type.

Optionally, the terminal device may receive two pieces of DCI signaling from one network device, or separately receive one piece of DCI signaling from two network devices, where each piece of DCI signaling may indicate one common beam. Alternatively, the terminal device receives one piece of DCI signaling from the network device, where the DCI signaling indicates the two common beams. For example, two TCI fields in the DCI signaling may respectively indicate the two common beams. In other words, one TCI field correspondingly indicates one common beam.

It should be noted that, in this embodiment of this application, the DCI signaling may indicate only a common beam of one type, or may indicate common beams of a plurality of types, or may indicate both an uplink common beam and a downlink beam in a manner of indicating a common beam pair. For example, a field value of a TCI field in the DCI signaling correspondingly indicates one common beam pair. The common beam pair may include one uplink common beam and one downlink common beam, or may include only one uplink common beam, or may include only one downlink common beam.

In this embodiment of this application, for common beams of a same type, the DCI signaling may indicate only one common beam in the common beams of the same type, or may indicate a plurality of common beams in the common beams of the same type. For example, when the DCI signaling indicates two common beams of a same type, it may indicate that the terminal device may need to communicate with network devices by using the two common beams of the same type. In addition, the DCI signaling may alternatively indicate a common beam pair. The DCI signaling may indicate only one common beam pair, or may indicate a plurality of common beam pairs. This is not specifically limited in this application.

For example, a specific indication manner of the DCI signaling in this application includes but is not limited to the following several indication manners.

In a first indication manner, the terminal device receives one piece of DCI signaling from the network device, where the DCI signaling includes two TCI fields. To be specific, the two TCI fields may be represented as two subfields of one TCI field.

It should be noted that, in the two TCI fields in the DCI signaling, a first TCI field always exists, and whether a second TCI field exists is determined by using the RRC configuration signaling. When a plurality of common beam sets of a same type, for example, two common beam sets, are configured, the second TCI field exists. When only one common beam set of a same type is configured, the second TCI field does not exist. Alternatively, the terminal device may determine, based on a value of a parameter M, N, or L included in the RRC configuration signaling, whether the second TCI field exists. For example, if the value of the parameter M, N, or L is set to 2, it indicates that the second TCI field exists; or if the value of the parameter M, N, or L is set to 1, it indicates that the second TCI field does not exist. Alternatively, the network device may directly indicate, by using a parameter of one piece of RRC configuration signaling, whether the second TCI field exists.

The two TCI fields in the DCI signaling separately correspond to one of two first common beam groups (namely, a group of common beams) or two second common beam pairs (namely, a group of common beam pairs) activated by using the MAC-CE signaling. Specifically, the first TCI field corresponds to one first common beam group #1 or one second common beam group #2, and the second TCI field corresponds to the other second common beam group #2 or the other first common beam group #1.

Alternatively, the two TCI fields in the DCI signaling respectively correspond to two sets of the common beams of the same type that are configured by using the RRC configuration signaling.

For example, two uplink and downlink common beam sets are configured by using the RRC configuration signaling, and the two TCI fields in the DCI signaling respectively correspond to the two uplink and downlink common beam sets. In this way, uplink and downlink common beams indicated by one TCI field all belong to an uplink and downlink common beam set corresponding to the TCI field.

Alternatively, each TCI field in the DCI signaling corresponds to one uplink common beam set and one downlink common beam set that are configured by using the RRC configuration signaling.

For example, two uplink common beam sets and two downlink common beam sets are configured by using the RRC configuration signaling, the first TCI field in the DCI signaling corresponds to a first uplink common beam set and a first downlink common beam set, and the second TCI field in the DCI signaling corresponds to a second uplink common beam set and a second downlink common beam set. In this case, when one TCI field in the DCI signaling may indicate both an uplink common beam and a downlink common beam, all uplink common beams and all downlink common beams indicated by the TCI field respectively belong to an uplink common beam set and a downlink common beam set that correspond to the field.

In a second indication manner, the terminal device receives two pieces of DCI signaling from the network device, where each piece of DCI signaling includes one TCI field, and the TCI field in each piece of DCI signaling corresponds to one common beam group or a same group of common beam pairs. To be specific, common beams corresponding to all field values of the TCI field in each piece of DCI signaling all belong to the common beam group or the same group of common beam pairs.

Specifically, in a manner of determining a specific group corresponding to a common beam indicated by the TCI field in each piece of DCI signaling, the specific group may be indicated by a dedicated field, or may be indicated by a first bit or a last bit of the TCI field. For example, if a field value/bit value of a common beam or a common beam pair is 0, it indicates that the common beam belongs to a first group of common beams, or the common beam pair belongs to a first group of common beam pairs; or if a field value/bit value of a common beam or a common beam pair is 1, it indicates that the common beam belongs to a second group of common beams, or the common beam pair belongs to a second group of common beam pairs.

Alternatively, the specific group may be determined by using a CORESET group identifier corresponding to the DCI signaling. Each CORESET group identifier corresponds to a group of common beams or a group of common beam pairs. If the DCI signaling is carried on a PDCCH corresponding to a specific CORESET group, the TCI field corresponds to a specific group of common beams or common beam pairs corresponding to the specific CORESET group.

It should be understood that the first group of common beams may correspond to the first common beam group in the method in FIG. 3, and the second group of common beams may correspond to the second common beam group in the method in FIG. 3.

It should be noted that one TCI field in the DCI signaling may alternatively correspond to one common beam set. That is, common beams indicated by the TCI field all belong to the common beam set. For example, the network device configures two uplink and downlink common beam sets, and the TCI field corresponds to one of the two uplink and downlink common beam sets. A specific set corresponding to the TCI field may be indicated by a dedicated field, or may be indicated by a first bit or a last bit of the TCI field, or may be determined by using a CORESET group identifier corresponding to the DCI. Each CORESET group identifier corresponds to one set. If the DCI signaling is carried on a PDCCH corresponding to a CORESET group, the TCI field corresponds to a specific set corresponding to the CORESET group.

In addition, one TCI field in the DCI signaling may alternatively correspond to a plurality of common beam sets, for example, one uplink common beam set and one downlink common beam set. For example, the network device configures two uplink common beam sets and two downlink common beam sets. The TCI field corresponds to one of the two uplink common beam sets and one of the two downlink common beam sets, for example, corresponds to a first uplink common beam set and a first downlink common beam set, or corresponds to a second uplink common beam set and a second downlink common beam set. A specific uplink common beam set and a specific downlink common beam set that correspond to the TCI field may be indicated by a dedicated field, or may be indicated by a first bit or a last bit of the TCI field, or may be determined by using a CORESET group identifier corresponding to the DCI signaling. Each CORESET group identifier corresponds to one uplink common beam set and one downlink common beam set. If the DCI signaling is carried on a PDCCH corresponding to a specific CORESET group, the TCI field corresponds to a specific uplink common beam set and a specific downlink common beam set that correspond to the specific CORESET group.

In a third indication manner, the terminal device receives two pieces of DCI signaling from the network device, where each piece of DCI signaling includes one TCI field, field values of the TCI field are divided into a plurality of parts, and each part corresponds to a group of common beams or a group of common beam pairs.

It should be noted that, in this embodiment, TCI field values in each piece of DCI signaling are divided into two parts. Field values in a first part correspond to a first group of common beams or a first group of common beam pairs, and field values in a second part correspond to a second group of common beams or a second group of common beam pairs. Alternatively, in the TCI field in each piece of DCI signaling, field values in a first part correspond to a first common beam set, and field values in a second part correspond to a second common beam set.

It should be understood that the first common beam set and the second common beam set are sets of common beams of a same type that are configured by using the RRC configuration signaling.

Specifically, the field values of the TCI field in each piece of DCI signaling may be divided according to the following methods.

Method 1: A first half of the field values of the TCI field in each piece of DCI signaling are used as the field values in the first part, and a second half of the field values are used as the field values in the second part. In this case, common beams corresponding to the field values in the first part all belong to the first group of common beams, and common beams corresponding to the field values in the second part all belong to the second group of common beams.

Method 2: Field values that are in the TCI field and whose sequence number are odd numbers are used as the field values in the first part, and field values that are in the TCI field and whose sequence number are even numbers are used as the field values in the second part. In this case, common beams corresponding to the field values in the first part all belong to the first group of common beams, and common beams corresponding to the field values in the second part all belong to the second group of common beams.

Method 3: It is assumed that quantities of the field values in two parts in the TCI field are respectively S and Q, where a value of S and/or a value of Q may be indicated by RRC configuration signaling, MAC-CE signaling, or DCI signaling.

Method 4: A manner of dividing the field values is determined in a manner that is of dividing common beams and that is indicated by the MAC-CE signaling. For example, according to the method in S402, a plurality of groups of common beams or a plurality of groups of common beam pairs are activated by using one or more pieces of MAC-CE signaling, where a quantity of a group of common beams or common beam pairs is equal to a quantity of TCI field values corresponding to the group of common beams or common beam pairs.

In a fourth indication manner, the terminal device receives one piece of DCI signaling from the network device, where the DCI signaling includes one TCI field, and each field value of the TCI field indicates both two common beams of a same type, or indicates both two common beam pairs. The terminal device receives a field value of the TCI field, where the field value indicates the two common beams of the same type, and the two common beams of the same type respectively belong to different common beam groups.

It should be noted that when the fourth indication manner is used, grouping does not need to be performed after common beams are activated by using the MAC-CE signaling in step S402, but the common beams needs to be activated in the following special MAC-CE signaling formats. Specifically, the following formats may be included.

In a first format, each TCI field value corresponds to two common beam pairs. Each common beam pair includes an uplink common beam and/or a downlink common beam.

For example, the TCI field includes two field values: a TCI field value #0 and a TCI field value #1. In this case, the TCI field value #0 corresponds to a common beam pair #1 and a common beam pair #2, and the TCI field value #1 corresponds to a common beam pair #3 and a common beam pair #4.

In a second format, each TCI field value corresponds to one or two common beam pairs. It is assumed that A TCI field values correspond to one common beam pair, and B TCI field values correspond to two common beam pairs. A value of A and/or a value of B may be indicated by RRC signaling, MAC-CE signaling, or DCI signaling to the terminal device.

For example, in the MAC-CE signaling used to activate the common beam pair, a value of A and/or a value of B are/is indicated by one or more fields. Further, all TCI field values corresponding to both two common beam pairs may be arranged after a TCI field value corresponding to one common beam pair, or all TCI field values corresponding to both two common beam pairs may be arranged before a TCI field value corresponding to a single common beam pair.

When all the TCI field values corresponding to both two common beam pairs are arranged before the TCI field value corresponding to the single common beam pair, a TCI field value #0 corresponds to a common beam pair #1 and a common beam pair #2, a TCI field value #1 corresponds to a common beam pair #3, and a TCI field value #2 corresponds to a common beam pair #4.

S404: The terminal device performs communication by using at least one of the two common beams.

When step S404 is performed, according to the foregoing method, the network device may indicate common beams of different network devices (for example, base stations) to the terminal device. Two network devices are used as an example. When the network devices send DCI signaling to the terminal device, the DCI signaling indicates the two common beams, namely, a first common beam and a second common beam. The first common beam may be a common beam in a first common beam set in two common beam sets corresponding to common beams of a same type that are configured by using the RRC configuration signaling, and the second common beam is a common beam in a second common beam set. In this case, the terminal device may determine, based on indexes of the two common beams indicated by the DCI signaling, common beam sets to which the two common beams respectively belong.

Alternatively, the first common beam may belong to a first group of common beams in two groups of common beams or two groups of common beam pairs activated by using the MAC-CE signaling, and the second common beam belongs to a second group of common beams.

Alternatively, the first common beam may be a common beam indicated by first DCI signaling, and the second common beam is a common beam indicated by second DCI signaling. The first DCI signaling and the second DCI signaling separately correspond to one of two groups of common beams or common beam pairs activated by using the MAC-CE.

Alternatively, the first common beam may be a common beam indicated by a first TCI field, and the second common beam is a common beam indicated by a second TCI field. The first TCI field and the second TCI field are two TCI fields in same DCI signaling or two sub-fields of a same TCI field.

Alternatively, the first common beam may be a common beam indicated by TCI field values in a first part, and the second common beam is a common beam indicated by TCI field values in a second part. The TCI field values in the first part and the TCI field values in the second part separately indicate a part of TCI field values in the DCI signaling.

Alternatively, the first common beam and the second common beam are respectively two common beams of a same type that are indicated by a same TCI field value, or a first common beam pair and a second common beam pair in two common beam pairs indicated by a same TCI field value.

In this way, after determining, based on the DCI signaling, to indicate one common beam, the terminal device may determine whether the common beam belongs to the first group of common beams or the second group of common beams. If the common beam belongs to the first group of common beams, the indicated common beam is selected from the first group of common beams to replace the currently used first common beam, and subsequently the indicated first common beam is always used for communication. If the common beam belongs to the second group of common beams, the indicated common beam is selected from the second group of common beams to replace the currently used second common beam, and subsequently the indicated second common beam is always used for communication.

The terminal device usually maintains only a single common beam or a single common beam pair. However, in this embodiment of this application, the terminal device may maintain a plurality of common beams or common beam pairs. Specifically, the terminal device determines, based on one or more of the following conditions, that a plurality of (for example, two) common beams or common beam pairs need to be maintained, or determines that a plurality of (for example, two) common beams may take effect simultaneously.

Condition 1: The network device configures more than one uplink common beam set, for example, two uplink common beam sets, and/or more than one downlink common beam set, for example, two downlink common beam sets, and/or more than one uplink and downlink common beam set, for example, two uplink and downlink common beams.

Condition 2: A quantity of downlink common beams that need to be maintained or used by the terminal device and that are configured by the network device is greater than 1. To be specific, a parameter M included in the RRC configuration signaling is greater than 1 (for example, M=2), and/or a parameter N included in the RRC configuration signaling is greater than 1 (for example, N=2), and/or a parameter L included in the RRC configuration signaling is greater than 1 (for example, L=2).

Herein, M indicates a quantity of downlink common beams, N indicates a quantity of uplink common beams, and L indicates a quantity of uplink and downlink common beams.

Condition 3: Two groups of common beams of a same type or two groups of common beam pairs are activated by using the MAC-CE signaling.

Condition 4: The DCI signaling includes two TCI fields.

Condition 5: TCI field values in the DCI signaling are divided into two parts.

It should be noted that, in this embodiment of this application, after the network device indicates the two common beams (the first common beam and the second common beam) to the terminal device, the terminal device always uses the two common beams. However, when the network device needs to fall back to use one common beam for communication, for example, when the network device falls back to use only the first common beam, the network device needs to notify the terminal device, and then the terminal device does not use the other common beam.

Specifically, a manner in which the network device notifies the terminal device may include but not limited to the following two notification manners.

In a first notification manner, a field in DCI signaling indicates that the terminal device uses the first common beam, the second common beam, or both the common beams.

For example, a 2-bit field is used. The field has four field values, where three field values respectively indicate that the terminal device uses the first common beam, the second common beam, or both the common beams.

Optionally, a remaining field value may further indicate that neither of the two common beams is used. Whether the field exists depends on the RRC configuration signaling. For example, when a plurality of common beam sets of a same type, for example, two common beam sets, are configured, it indicates that the field exists. When only one common beam set of a same type is configured, it indicates that the field does not exist. For another example, when a value of a parameter M, N, or L included in the RRC configuration signaling is set to 2, it indicates that the field exists. When a value of a parameter M, N, or L included in the RRC configuration signaling is set to 1, it indicates that the field does not exist. For another example, an RRC parameter may directly indicate whether the field exists.

In a second notification manner, a specific common beam used by the terminal device is determined by using recently received MAC-CE signaling used to activate a common beam. If only one group of common beams or one group of common beam pairs are activated by using the MAC-CE signaling, it indicates that the terminal device needs to fall back to a mode in which one common beam is used.

In this case, the terminal device uses only a specific common beam (the first common beam or the second common beam) corresponding to the group of common beams or common beam pairs activated by using the MAC-CE signaling, and does not use the other common beam.

When two groups of common beams or common beam pairs are activated by using the MAC-CE signaling, if one group of common beams or common beam pairs includes only a single common beam or a single common beam pair, the terminal device may directly use the common beam or the common beam pair without a further indication by using the DCI signaling.

In conclusion, in the embodiment shown in FIG. 4, the network device sends the RRC configuration signaling to the terminal device, to configure common beams for the terminal device. Then, the network device sends the MAC-CE signaling to the terminal device, to activate the common beams configured for the terminal device, and groups the activated common beams. Further, the terminal device receives one or two pieces of DCI signaling from the network device, where the one or two pieces of DCI signaling indicate two common beams, and each common beam belongs to the first common beam group or the second common beam group. Finally, the terminal device may determine, in an indication manner of the DCI signaling defined in the method in this application, whether the common beams indicated by the one or two pieces of DCI signaling belong to a same common beam group, to determine to use one or two common beams to communicate with the network device. In this embodiment, the terminal device can accurately distinguish between common beam groups to which two common beams of a same type that are indicated by the network device belong, namely, corresponding network devices, to determine to use the one or two common beams of the same type to communicate with the corresponding network devices.

Based on a same technical concept, an embodiment of this application provides a communication apparatus. The apparatus may be used in the terminal device in the method in this application. To be specific, the apparatus includes modules or units that are in a one-to-one correspondence with methods/operations/steps/actions performed by the terminal device in the foregoing embodiments. The modules or units may be hardware circuits or software, or may be implemented by hardware circuits in combination with software. The communication apparatus may have a structure shown in FIG. 5.

Figure 5:
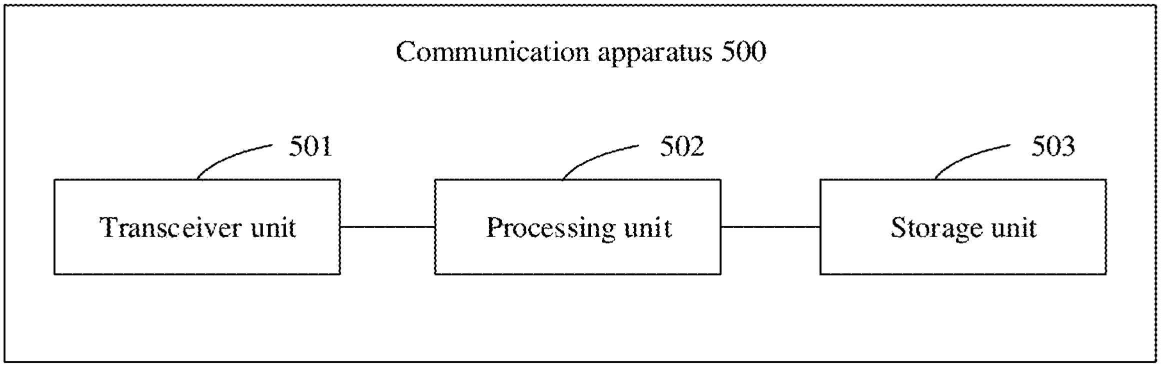
FIG. 5 is a schematic diagram of a structure of a communication apparatus according to an embodiment of this application.

As shown in FIG. 5, the communication apparatus 500 may include a transceiver unit 501. The transceiver unit 501 may implement a corresponding communication function. Specifically, the transceiver unit may specifically include a receive unit and/or a transmit unit. The receive unit may be configured to receive information, data, and/or the like, and the transmit unit may be configured to send information and/or data. The transceiver unit may also be referred to as a communication interface or a transceiver module.

Optionally, the communication apparatus 500 further includes a processing unit 502. The processing unit 502 is equivalent to a processing module, and may be configured to perform data processing.

Optionally, the communication apparatus 500 may further include a storage unit 503. The storage unit 503 is equivalent to a storage module, and may be configured to store instructions and/or data. The processing unit 502 may read the instructions and/or the data in the storage module, so that the communication apparatus implements the foregoing method embodiments.

The communication apparatus 500 may be configured to perform an action performed by the terminal device in the foregoing method embodiments. The communication apparatus 500 may be a terminal device or a component that may be disposed in the terminal device. The transceiver unit 501 is configured to perform a receive-related operation on the terminal device side in the foregoing method embodiments, and the processing unit 502 is configured to perform a processing-related operation on the terminal device side in the foregoing method embodiments.

Optionally, the transceiver unit 501 may include a transmit unit and a receive unit. The transmit unit is configured to perform a transmit operation in the foregoing method embodiments. The receive unit is configured to perform a receive operation in the foregoing method embodiments.

It should be noted that the communication apparatus 500 may include the transmit unit, but does not include the receive unit. Alternatively, the communication apparatus 500 may include the receive unit, but does not include the transmit unit. This may be specifically determined based on whether the foregoing solutions executed by the communication apparatus 500 include a transmit action and a receive action.

In an example, the communication apparatus 500 is configured to perform an action performed by the terminal device in the embodiment shown in FIG. 3 or FIG. 4.

For example, the transceiver unit 501 receives first configuration information sent by a network device, where the first configuration information is used to configure M common beams of a same type, and M is an integer greater than 1.

Optionally, the processing unit 502 may be configured to perform S304 in the embodiment shown in FIG. 3, or may be configured to perform S404 in the embodiment shown in FIG. 4. For example, the processing unit 502 may be configured to determine to use at least one of the two common beams based on a common beam group to which the two common beams belong to communicate with the network device.

It should be understood that a specific process in which the units perform the foregoing corresponding steps is described in detail in the foregoing method embodiments. For brevity, details are not described herein again.

The processing unit 502 in the foregoing embodiment may be implemented by at least one processor or a processor-related circuit. The transceiver unit 501 may be implemented by a transceiver or a transceiver-related circuit. The storage unit 503 may be implemented by at least one memory.

Based on a same technical concept, an embodiment of this application provides a communication apparatus. The apparatus may be used in the network device in the method in this application. To be specific, the apparatus includes modules or units that are in a one-to-one correspondence with methods/operations/steps/actions performed by the network device in the foregoing embodiments. The modules or units may be hardware circuits or software, or may be implemented by hardware circuits in combination with software. The communication apparatus may also have a structure shown in FIG. 5.

As shown in FIG. 5, the communication apparatus 500 may include a transceiver unit 501. The transceiver unit 501 may implement a corresponding communication function. Specifically, the transceiver unit may specifically include a receive unit and/or a transmit unit. The receive unit may be configured to receive information, data, and/or the like, and the transmit unit may be configured to send information and/or data. The transceiver unit may also be referred to as a communication interface or a transceiver module.

Optionally, the communication apparatus 500 further includes a processing unit 502. The processing unit 502 is equivalent to a processing module, and may be configured to perform data processing and/or a beam indication configuration process.

Optionally, the communication apparatus 500 may further include a storage unit 503. The storage unit 503 is equivalent to a storage module, and may be configured to store instructions and/or data. The processing unit 502 may read the instructions and/or the data in the storage module, so that the communication apparatus implements the foregoing method embodiments.

The communication apparatus 500 may be configured to perform an action performed by the network device in the foregoing method embodiments. The communication apparatus 500 may be a network device or a component that may be disposed in the network device. The transceiver unit 501 is configured to perform a receive-related operation on the network device side in the foregoing method embodiments, and the processing unit 502 is configured to perform a processing-related operation on the network device side in the foregoing method embodiments.

Optionally, the transceiver unit 501 may include a transmit unit and a receive unit. The transmit unit is configured to perform a transmit operation in the foregoing method embodiments. The receive unit is configured to perform a receive operation in the foregoing method embodiments.

It should be noted that the communication apparatus 500 may include the transmit unit, but does not include the receive unit. Alternatively, the communication apparatus 500 may include the receive unit, but does not include the transmit unit. This may be specifically determined based on whether the foregoing solutions executed by the communication apparatus 500 include a transmit action and a receive action.

In an example, the communication apparatus 500 is configured to perform an action performed by the network device in the embodiment shown in FIG. 3 or FIG. 4.

For example, the transceiver unit 501 sends first configuration information to a terminal device, where the first configuration information is used to configure M common beams of a same type, and M is an integer greater than 1.

It should be understood that a specific process in which the modules perform the foregoing corresponding steps is described in detail in the foregoing method embodiments. For brevity, details are not described herein again.

The processing unit 502 in the foregoing embodiment may be implemented by at least one processor or a processor-related circuit. The transceiver unit 501 may be implemented by a transceiver or a transceiver-related circuit. The storage unit may be implemented by at least one memory.

This application further provides a communication device 600. The communication device 600 may be a terminal device, a processor of a terminal device, or a chip. The communication device 600 may be configured to perform operations performed by the terminal device in the foregoing method embodiments. Alternatively, the communication device 600 may be a network device, a processor of a network device, or a chip. The communication device 600 may be configured to perform operations performed by the network device in the foregoing method embodiments.

Figure 6:
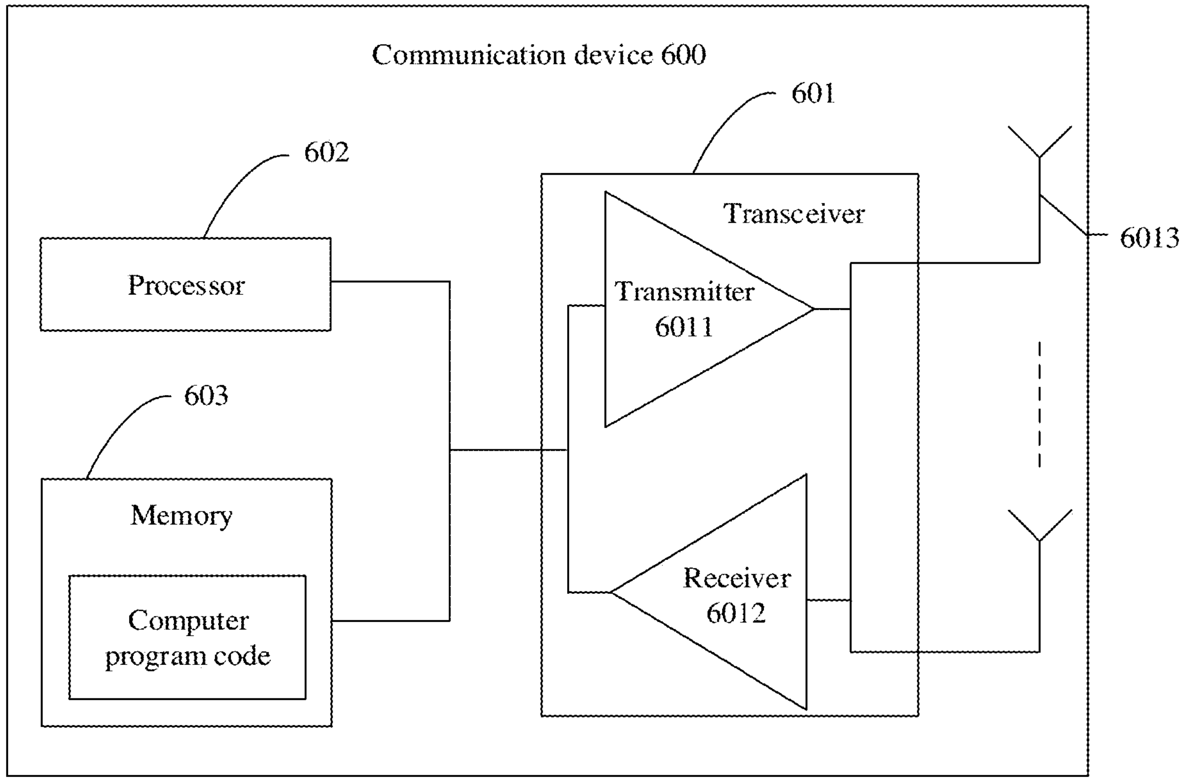
FIG. 6 is a schematic diagram of a structure of a communication device according to an embodiment of this application.

When the communication device 600 is the terminal device, FIG. 6 is a simplified schematic diagram of a structure of the terminal device. As shown in FIG. 6, the terminal device includes a transceiver 601, a processor 602, and a memory 603. The transceiver 601 includes a transmitter machine 6011, a receiver machine 6012, a radio frequency circuit (not shown in the figure), an antenna 6013, and an input/output apparatus (not shown in the figure). The memory 603 may store computer program code.

The processor 602 is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna 6013 is mainly configured to receive and send a radio frequency signal in a form of an electromagnetic wave. The input/output apparatus, for example, a touchscreen, a display, or a keyboard, is mainly configured to: receive data input by a user, and output data to the user. It should be noted that some types of terminal devices may have no input/output apparatus.

When needing to send data, after performing baseband processing on the to-be-sent data, the processor 602 outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor 602 converts the baseband signal into data, and processes the data. For ease of description, FIG. 6 shows only one memory, one processor, and one transceiver. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have a transceiver function may be considered as a transceiver unit (a transceiver module) of the terminal device, and the processor having a processing function may be considered as a processing unit (a processing module) of the terminal device.

As shown in FIG. 6, the terminal device includes a transceiver 601, a processor 602, and a memory 603. The transceiver 601 may also be referred to as a transceiver unit, a transceiver machine, a transceiver apparatus, or the like. The processor 602 may also be referred to as a processing unit, a processing board, a processing module, a processing apparatus, or the like.

Optionally, a component that is in the transceiver 601 and that is configured to implement a receive function may be considered as a receive module, and a component that is in the transceiver 601 and that is configured to implement a transmit function may be considered as a transmit unit or a transmit module. In other words, the transceiver 601 includes a transmitter machine 6011 and a receiver machine 6012. The transceiver 601 sometimes may also be referred to as a transceiver machine, a transceiver module, a transceiver circuit, or the like. The transmitter machine 6011 sometimes may also be referred to as a transmitter, a transmit module, a transmit circuit, or the like. The receiver machine 6012 sometimes may also be referred to as a receiver, a receive module, a receive circuit, or the like.

For example, in an implementation, the processor 602 is configured to perform a processing action on the terminal device side in the embodiment shown in FIG. 3 or FIG. 4, and the transceiver 601 is configured to perform transmit and receive actions on the terminal device side in FIG. 3 or FIG. 4. For example, the transceiver 601 is configured to perform the operations of S301 to S303 or S401 to S403 in the embodiment shown in FIG. 3 or FIG. 4. Specifically, the transceiver 601 may receive the first configuration information, the first indication information, and the second indication information from the network device. The processor 602 is configured to perform the processing operation of S304 or S404 in the embodiment shown in FIG. 3 or FIG. 4.

It should be understood that FIG. 6 is merely an example but not a limitation, and the foregoing terminal device including the transceiver module and the processing module may not depend on the structure shown in FIG. 3 or FIG. 4.

When the communication device 600 is a chip, the chip includes a processor, a memory, and a transceiver. The transceiver may be an input/output circuit or a communication interface. The processor may be a processing module, a microprocessor, or an integrated circuit integrated on the chip. The transmit operation performed by the terminal device in the foregoing method embodiments may be understood as an output of the chip, and the receive operation performed by the terminal device in the foregoing method embodiments may be understood as an input of the chip.

When the communication device 600 is a network device, for example, a base station, FIG. 6 is a simplified schematic diagram of a structure of the network device. The network device includes a transceiver 601 part, a processor 602 part, and a memory 603 part. The processor 602 part is mainly configured to: perform baseband processing, control the base station, and the like. The processor 602 part is usually a control center of the base station, may be usually referred to as a processor, and is configured to control the base station to perform a processing operation on the network device side in the foregoing method embodiments. The memory 603 part is mainly configured to store computer program code and data. The transceiver 601 part is mainly configured to: receive and send a radio frequency signal, and perform conversion between the radio frequency signal and a baseband signal. The transceiver 601 part may be usually referred to as a transceiver module, a transceiver machine, a transceiver circuit, a transceiver, or the like. The transceiver 601 part may also be referred to as a transceiver machine, a transceiver module, or the like. The transceiver 601 part includes an antenna 6013 and a radio frequency circuit (not shown in the figure). The radio frequency circuit is mainly configured to perform radio frequency processing. Optionally, a component that is in the transceiver 601 part and that is configured to implement a receive function may be considered as a receiver machine, and a component that is in the transceiver 601 part and that is configured to implement a transmit function may be considered as a transmitter machine. In other words, the transceiver 601 part includes a transmitter machine 6011 and a receiver machine 6012. The receiver machine may also be referred to as a receive module, a receiver, a receive circuit, or the like, and the transmitter machine may be referred to as a transmit module, a transmitter, a transmit circuit, or the like.

The transceiver 601 part and the memory 603 part may include one or more boards. Each board may include one or more processors and one or more memories. The processor is configured to read and execute a program in the memory, to implement a baseband processing function and control the base station. If there are a plurality of boards, the boards may be interconnected with each other to enhance a processing capability. In an optional implementation, a plurality of boards may share one or more processors, or a plurality of boards share one or more memories, or a plurality of boards simultaneously share one or more processors.

For example, in an implementation, the transceiver module in the transceiver 601 part is configured to perform receive and transmit-related processes performed by the network device in the embodiments shown in FIG. 3 and FIG. 4. The processor in the processor 602 part is configured to perform a processing-related process performed by the network device in the embodiments shown in FIG. 3 and FIG. 4.

It should be understood that FIG. 6 is merely an example but not a limitation. The network device including the processor, the memory, and the transceiver may not depend on the structure shown in FIG. 6.

When the communication device 600 is a chip, the chip includes a transceiver, a memory, and a processor. The transceiver may be an input/output circuit or a communication interface. The processor is a processor, a microprocessor, or an integrated circuit integrated on the chip. The transmit operation performed by the network device in the foregoing method embodiments may be understood as an output of the chip, and the receive operation performed by the network device in the foregoing method embodiments may be understood as an input of the chip.

An embodiment of this application further provides a computer-readable storage medium. The computer-readable storage medium stores computer instructions used to implement the method performed by the communication apparatus in the foregoing method embodiments.

For example, when a computer program is executed by a computer, the computer is enabled to implement the method performed by the network device in the foregoing method embodiments.

An embodiment of this application further provides a computer program product including instructions. When the instructions are executed by a computer, the computer is enabled to implement the method performed by the network device in the foregoing method embodiments.

An embodiment of this application further provides a communication system. The communication system includes the terminal device and the network device in the foregoing embodiments.

An embodiment of this application further provides a chip apparatus. The chip apparatus includes a processor, configured to invoke a computer program or computer instructions that is/are stored in a memory, so that the processor performs the beam indication method in the embodiments shown in FIG. 3 and FIG. 4.

In a possible implementation, inputs of the chip apparatus correspond to the receive operations in the embodiments shown in FIG. 3 and FIG. 4, and outputs of the chip apparatus correspond to the transmit operations in the embodiments shown in FIG. 3 and FIG. 4.

Optionally, the processor is coupled to the memory through an interface.

Optionally, the chip apparatus further includes the memory. The memory stores the computer program or the computer instructions.

The processor mentioned in any of the foregoing descriptions may be a general-purpose central processing unit, a microprocessor, an application-specific integrated circuit (ASIC), or one or more of integrated circuits configured to control program execution of the beam indication method in embodiments shown in FIG. 3 and FIG. 4. The memory mentioned in any of the foregoing descriptions may be a read-only memory (ROM), another type of static storage device that can store static information and instructions, a random access memory (RAM), or the like.

It should be noted that, for the purpose of convenient and brief description, for explanations and beneficial effects of related content in any communication apparatus provided above, refer to corresponding method embodiments provided above. Details are not described herein again.

In this application, the terminal device or the network device may include a hardware layer, an operating system layer running on the hardware layer, and an application layer running on the operating system layer. The hardware layer may include hardware such as a central processing unit (CPU), a memory management unit (MMU), and a memory (also referred to as a main memory). An operating system at the operating system layer may be any one or more types of computer operating systems that implement service processing through a process, for example, a Linux operating system, a Unix operating system, an Android operating system, an iOS operating system, or a Windows operating system. The application layer may include applications such as a browser, an address book, word processing software, and instant messaging software.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

In conclusion, this application provides a beam indication method. The method includes: First, a terminal device receives first configuration information from a network device, to configure M common beams of a same type, where M is an integer greater than 1; then, the terminal device receives first indication information from the network device, to activate N common beams in the M common beams of the same type, and indicate that the N common beams are grouped into a first common beam group and a second common beam group, where N is an integer greater than 1 and less than or equal to M; further, the terminal device receives one or more pieces of first downlink control information from the network device, where the one or more pieces of first downlink control information indicate two common beams of a same type; and finally, the terminal device may communicate with a corresponding network device by using one or two common beams based on a common beam group to which the two common beams belong. In the method, the terminal device can accurately distinguish between common beam groups to which a plurality of common beams of a same type belong, namely, corresponding network devices, to communicate with the corresponding network devices by using one or more common beams of the same type.

With descriptions of the foregoing implementations, a person skilled in the art may clearly understand that embodiments of this application may be implemented by hardware, firmware or a combination thereof. When embodiments of this application is implemented by software, the foregoing functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible to a computer. The following is taken as an example but is not limited: The computer-readable medium may include a RAM, a ROM, an electrically erasable programmable read only memory (EEPROM), a compact disc read-only memory (CD-ROM) or another optical disc storage, a disk storage medium or another disk storage device, or any other medium that can be used to carry or store expected program code in an instruction or data structure form and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared, radio, and microwave, the coaxial cable, optical fiber/cable, twisted pair, the DSL, or wireless technologies such as infrared, radio, and microwave are included in a definition of a medium to which the coaxial cable, optical fiber/cable, twisted pair, DSL, or wireless technologies such as infrared ray, radio, and microwave belong. For example, a disk and a disc used in embodiments of this application include a compact disc (CD), a laser disc, an optical disc, a digital video disc (DVD), a floppy disk, and a Blu-ray disc. The disk usually copies data in a magnetic manner, and the disc copies data optically in a laser manner. The foregoing combination should also be included in the protection scope of the computer-readable medium.

In summary, what is described above is merely embodiments of this application, but is not intended to limit the protection scope of this application. Any modification, equivalent replacement, and improvement made based on the disclosure of this application shall fall within the protection scope of this application.

What is claimed is:

1. A method, comprising:

receiving first configuration information from a network device, wherein the first configuration information is used to configure M common beams of a same type, and M is an integer greater than 1;

receiving a medium access control-control element (MAC-CE) from the network device, wherein the MAC-CE is used to activate N common beams in the M common beams of the same type, and to group the N common beams into a first common beam group and a second common beam group, wherein N is an integer greater than 1, and wherein N is less than or equal to M; and receiving second indication information from the network device, wherein the second indication information indicates two common beams, and the two common beams include a first common beam belonging to the first common beam group and a second common beam belonging to the second common beam group.

2. The method according to claim 1, wherein the second indication information is in a transmission configuration indicator (TCI) field in downlink control information (DCI).

3. The method according to claim 1, further comprising:

communicating with the network device by using the two common beams.

4. A method, comprising:

sending first configuration information to a terminal device, wherein the first configuration information is used to configure M common beams of a same type, and M is an integer greater than 1;

sending a medium access control-control element (MAC-CE) to the terminal device, wherein the MAC-CE is used to activate N common beams in the M common beams of the same type, and to group the N common beams into a first common beam group and a second common beam group, wherein N is an integer greater than 1, and wherein N is less than or equal to M; and sending second indication information to the terminal device, wherein the second indication information indicates two common beams, and the two common beams include a first common beam belonging to the first common beam group and a second common beam belonging to the second common beam group.

5. The method according to claim 4, wherein the second indication information is in a transmission configuration indicator (TCI) field in downlink control information (DCI).

6. The method according to claim 4, further comprising:

communicating with the terminal device by using the two common beams.

7. An apparatus, comprising:

at least one processor; and a non-transitory computer readable storage medium storing programming, the programming including instructions that, when executed by the at least one processor, cause the apparatus to perform:

receiving first configuration information from a network device, wherein the first configuration information is used to configure M common beams of a same type, and M is an integer greater than 1;

receiving a medium access control-control element (MAC-CE) from the network device, wherein the MAC-CE is used to activate N common beams in the M common beams of the same type, and to group the N common beams into a first common beam group and a second common beam group, wherein N is an integer greater than 1, and wherein N is less than or equal to M; and receiving second indication information from the network device, wherein the second indication information indicates two common beams, and the two common beams include a first common beam belonging to the first common beam group and a second common beam belonging to the second common beam group.

8. The apparatus according to claim 7, wherein the second indication information is in a transmission configuration indicator (TCI) field in downlink control information (DCI).

9. The apparatus according to claim 7, the instructions, when executed by the at least one processor, further causing the apparatus to perform:

communicating with the network device by using the two common beams.

10. An apparatus, comprising:

at least one processor; and a non-transitory computer readable storage medium storing programming, the programming including instructions that, when executed by the at least one processor, cause the apparatus to perform:

sending first configuration information to a terminal device, wherein the first configuration information is used to configure M common beams of a same type, and M is an integer greater than 1;

sending a medium access control-control element (MAC-CE) to the terminal device, wherein the MAC-CE is used to activate N common beams in the M common beams of the same type, and to group the N common beams into a first common beam group and a second common beam group, wherein N is an integer greater than 1, and wherein N is less than or equal to M; and sending second indication information to the terminal device, wherein the second indication information indicates two common beams, and the two common beams include a first common beam belonging to the first common beam group and a second common beam belonging to the second common beam group.

11. The apparatus according to claim 10, wherein the second indication information is in a transmission configuration indicator (TCI) field in downlink control information (DCI).

12. The apparatus according to claim 10, the instructions, when executed by the at least one processor, further causing the apparatus to perform:

communicating with the terminal device by using the two common beams.

13. The method according to claim 1, wherein the first common beam group corresponds to a first network device, and the second common beam group corresponds to a second network device.

14. The method according to claim 4, wherein the first common beam group corresponds to a first network device, and the second common beam group corresponds to a second network device.

15. The apparatus according to claim 7, wherein the first common beam group corresponds to a first network device, and the second common beam group corresponds to a second network device.

16. The apparatus according to claim 10, wherein the first common beam group corresponds to a first network device, and the second common beam group corresponds to a second network device.

* * * * *